United States Patent
Nsimba-Dikwama

(10) Patent No.: US 11,092,956 B2
(45) Date of Patent: Aug. 17, 2021

(54) ACTIVE SAFETY CONTROL SYSTEM

(71) Applicant: Celestin Nsimba-Dikwama, Caen (FR)

(72) Inventor: Celestin Nsimba-Dikwama, Caen (FR)

(*) Notice: Subject to any disclaimer, the term of this patent is extended or adjusted under 35 U.S.C. 154(b) by 0 days.

(21) Appl. No.: 16/726,086

(22) Filed: Dec. 23, 2019

(65) Prior Publication Data
US 2020/0142394 A1  May 7, 2020

Related U.S. Application Data

(62) Division of application No. 16/205,976, filed on Nov. 30, 2018, now abandoned.

(60) Provisional application No. 62/593,843, filed on Dec. 1, 2017.

(51) Int. Cl.
| | | |
|---|---|---|
| G05D 1/00 | (2006.01) |
| G07C 5/08 | (2006.01) |
| B60R 25/042 | (2013.01) |
| B60W 40/09 | (2012.01) |
| F02P 11/00 | (2006.01) |
| F02P 5/15 | (2006.01) |
| G08G 1/0965 | (2006.01) |
| G07C 5/00 | (2006.01) |
| B60R 25/04 | (2013.01) |

(52) U.S. Cl.
CPC .......... *G05D 1/0011* (2013.01); *B60R 25/042* (2013.01); *B60W 40/09* (2013.01); *G07C 5/008* (2013.01); *G07C 5/085* (2013.01); *B60R 2025/0405* (2013.01); *B60R 2025/0415* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 9,776,563 | B1* | 10/2017 | Be | G08G 1/096775 |
| 2004/0004539 | A1* | 1/2004 | Collins | G08G 1/205 |
| | | | | 340/425.5 |
| 2005/0187693 | A1* | 8/2005 | Bate | B60R 25/04 |
| | | | | 701/70 |
| 2006/0265128 | A1* | 11/2006 | Miller | G08G 1/207 |
| | | | | 701/469 |
| 2017/0132927 | A1* | 5/2017 | Zlojutro | G08G 1/20 |

* cited by examiner

*Primary Examiner* — Aniss Chad
*Assistant Examiner* — Mahmoud M Kazimi
(74) *Attorney, Agent, or Firm* — Gerald R. Prettyman

(57) ABSTRACT

Systems and methods are disclosed for determining, and displaying, the regulatory compliance status of a motorized vehicle, a driver of a motorized vehicle, or a non-vehicle machine. An authorized agent, such as a law enforcement officer, can perform a remotely-initiated safe stop of a motorized vehicle to prevent a high-speed chase. A system management center can receive, store, and transmit regulatory compliance records indicating the regulatory compliance status of drivers, motorized vehicles, and non-vehicle machines. A motorized vehicle can detect, and report, a driver "tail-gating" the motorized vehicle. The regulatory compliance history of drivers, motorized vehicles, and non-vehicle machines can be queried by authorized users.

5 Claims, 14 Drawing Sheets

ACTIVE SAFETY CONTROL SYSTEM

RELATED APPLICATION

This application is a Division of application Ser. No. 16/205,976 filed Nov. 30, 2018 which is titled ACTIVE SAFETY CONTROL SYSTEM, which is incorporated by reference, and which claims priority to provisional application 62/593,843 filed Dec. 1, 2017. This application is related to PCT Application PCTUS1863520 filed Dec. 1, 2018 which is titled ACTIVE SAFETY CONTROL SYSTEM and which claims priority to provisional application 62/593,843 filed Dec. 1, 2017.

TECHNICAL FIELD

Embodiments of the present disclosure relate generally to automated detection of compliance of motorized vehicles, drivers, and non-vehicle machines with regulatory standards, and with emergency stopping of motorized vehicles.

BACKGROUND

Persons, physical devices, and other entities are often required to comply with certain applicable regulations. For example, a driver is required to be licensed by a department of motor vehicles in order to operate a motorized vehicle, such as a car, motorcycle, boat, and the like. A motorized vehicle is often required to meet regulatory requirements, such as the vehicle being registered with an department of motor vehicles, and a license fee or tax being paid, and other various vehicle inspections having been performed, such as an emissions compliance test. A driver of a motorized vehicle is further required to drive the vehicle in accordance with laws and regulations (generically, "the law"). Currently, in the prior art, an enforcement officer, such as a police officer, border patrol, park ranger, military police, or customs agent (generically "an officer"), turns on the officer's vehicle's lights and or sirens to instruct a vehicle to stop for inspection of compliance with the law.

To perform the compliance verification, an officer approaches the vehicle and instructs the driver to produce documents indicating compliance with the law. Approaching the stopped vehicle can endanger the officer, especially when the driver of the stopped vehicle is aware that the vehicle, and/or the driver, are not in compliance with the law. Further, a driver that is aware that the vehicle is not in compliance with the law (e.g. the vehicle is stolen) or the driver is not in compliance with the law (e.g. the driver has an outstanding warrant for arrest), will often wait until the officer has approached the stopped car, and then speed away to avoid arrest. In such circumstances, a high-speed chase will often ensue. High-speed chases are well-known to be hazardous to the public, generally, and to the driver who is fleeing arrest, and to the officer that is attempting to stop the vehicle and make an arrest.

Current methods of stopping a car, in the prior art, are physical means such as "tack strips" or "tire spikes" or "boxing-in" a fleeing driver with multiple law enforcement vehicles. In the prior art, there is currently no way for an enforcement officer to remotely, and safely, stop a moving vehicle.

Also in the prior art, there are many non-vehicle machines that also must comply with regulations. For example, a gasoline pump ("gas pump") is required to have emissions-controlling nozzles, and to dispense fuel to a customer's vehicle according to an amount displayed to the customer, within a regulated tolerance. Often, a Bureau of Weights and Measures will perform such a compliance test, and will certify that the gas pump complies with the test and is dated accordingly, and a compliance sticker is applied to the gas pump. A user of the gas pump often does not know where to look for such a compliance sticker, does not know whether, if the sticker date has passed, indicates that the pump was never compliant with the law, or has not been recertified as being compliant with the law. Similarly, a home or business owner that receives metered natural gas or electrical power also does not know whether the applicable meter on their home or business is accurate, and when it was last certified as accurately measuring the service (gas or electricity) that was provided and measured by the meter. Similarly, a home that has solar panels and generates electricity back to the utility power grid does not know whether the generated power is accurately being credited back to the consumer.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1A:
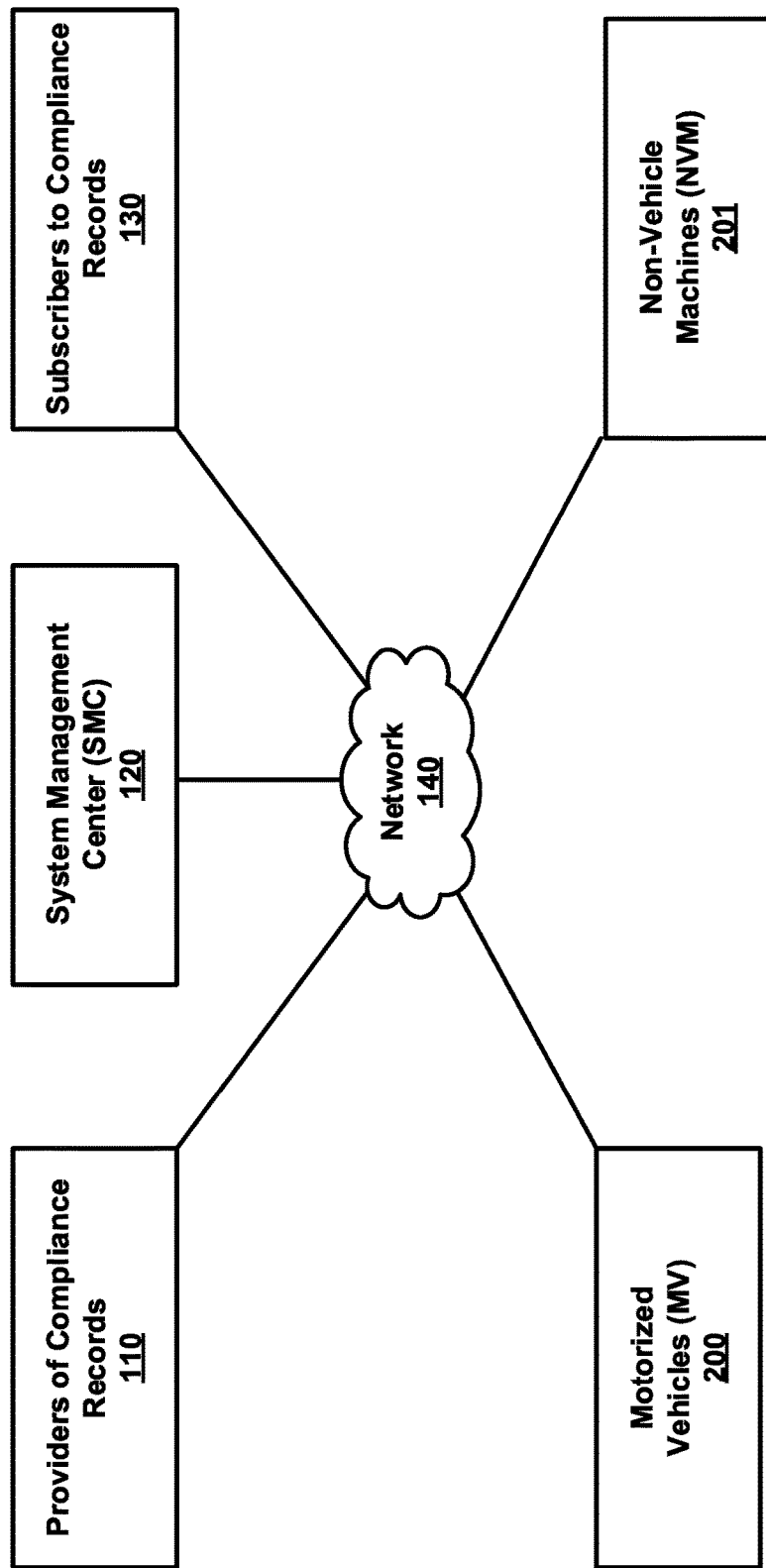
FIG. 1A is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In a first embodiment, a system for tracking regulatory compliance of motorized vehicles, drivers of motorized vehicles, and non-vehicle machines includes a provider of regulatory compliance records, subscribers to the regulatory compliance records, a plurality of motorized vehicles, a plurality of drivers of motorized vehicles, and a plurality of non-vehicle machines that are all subject to regulatory compliance, and a system management center, all interconnected via a network. A system management center manages receipt of regulatory compliance records for motorize vehicles, drivers of motorized vehicles, and for non-vehicle machines. The regulatory compliance records are received from a wide variety of regulatory compliance record providers, such as a department of motor vehicles, a motorized vehicle emissions testing business, insurers of drivers, from the motorized vehicles and non-motorized vehicles, Bureau of Weights and Measures, medical equipment regulatory compliance inspectors, non-vehicle machine inspectors, such as elevators, escalator, and amusement ride inspectors, etc. The system management center can receive regulatory compliance records from providers, store the regulatory compliance records in a storage associated with the system management center, and push the received compliance records to the motorized vehicle or non-vehicle machine to which the regulatory compliance records refer. Each driver of a motorized vehicle can also be subject to regulatory compliance, such as the requirement of having insurance for each motorized vehicle that the driver may drive, having a valid license to operate the motorized vehicle, and updates to the regulatory compliance status of the driver's operation of a motorized vehicle. Such records can be received from a provider, such as a department of motorized vehicles, insurer, or a law enforcement agent, and stored in the system management center. A driver of a motorized vehicle can be associated one or more motorized vehicles, such as by being a registered owner of the motorized vehicle or an insured driver associated with the motorized vehicle. Regulatory compliance records about the driver can be pushed by system management center down the central control unit of each motorized vehicle with which the driver is associated. The regulatory compliance status of the driver, and the motorized vehicle, can be displayed by the motorized vehicle central control unit on one more displays on the motorized vehicle.

In second embodiment, systems and methods are provided for an interlocked startup sequence of motorized vehicles. Each motorized vehicle can have a central control unit that is coupled to the subsystems of the motorized vehicle. Each motorized vehicle can have one or more displays, e.g. front and rear, an electronic control unit that controls operation of the motorized vehicle, and computing hardware of the motorized vehicle. When a driver attempts to start the vehicle, the central control unit can determine whether it can communicate with each of the subsystems. If not, the motorized vehicle will not start. The electronic control unit determines whether it can communicate with each of the operational subsystems of the motorized vehicle subsystems, such as a fuel control subsystem, an ignition subsystem, and a braking control subsystem. If not, the motorized vehicle will not start. Each subsystem can have a unique identifier, registered in a storage of the central control unit. If the unique identifier of any subsystem does not match the unique identifier for the subsystem that is registered in the central control unit, the motorized vehicle will not start. Each driver of a motorized vehicle can have an electronic key having a unique identifier, such as a radio frequency identifier (RFID) that is registered with the central control unit of the motorized vehicle and is associated with a unique identifier of the driver (e.g. a driver's license number of the driver). If the unique identifier of the key does not match a registered identifier in the central control unit storage, then the motorized vehicle will not start. In an embodiment, during startup, the central control unit can access regulatory compliance records about the driver and the motorized vehicle that are stored in the central control unit storage, and update their respective statuses on the displays of the motorized vehicle. If either the motorized vehicle or the driver are not in compliance with regulations, the motorized vehicle will not start.

In a third embodiment, systems and method for displaying a regulatory compliance status, each non-vehicle machine can have a central control unit that receives and stores regulatory compliance records from system management center. The non-vehicle machine can then update one or more displays on the non-vehicle machine to indicate the regulatory compliance status of the non-vehicle machine. If the non-vehicle machine is not compliant with regulations, such as by not having a current certification of regulatory compliance, then the central control unit of the non-vehicle machine can automatically disable the operation of the non-vehicle machine. In an embodiment, upon receipt, by the central control unit of the non-vehicle machine, of a regulatory compliance record indicating that the non-vehicle machine now complies with regulations, the central control unit of the non-vehicle machine can enable operation of the non-vehicle machine. In an embodiment, a non-vehicle machine having been previously disabled for having a non-compliant regulatory status can be temporarily operated by a user selecting a "manual override" feature from a user interface on the display of the non-vehicle machine. In an embodiment, a record of the temporary manual override of disablement of the non-vehicle machine can be stored in the central control unit memory. Usage of a non-compliant non-vehicle machine may, itself, be a regulatory violation. In an embodiment, a record of the temporary manual override of disablement of the non-vehicle machine, and the user that authorized the temporary override, can be transmitted to the system management center as a record of non-compliant usage of a non-compliant non-vehicle machine.

In fourth embodiment, systems and methods are provided for remotely, safely stopping a motorized vehicle. A law enforcement agent, such as a policeman, border control agent, park ranger, etc., (generically, "officer") can transmit a command to a motorized vehicle to request a unique machine identifier (ID) of the motorized vehicle. The officer can have a communication system that transmits the command to the motorized vehicle and receives, in response, the unique machine ID of the motorized vehicle. The officer can then use the unique machine ID and communication system to transmit a command to a central control unit of the motorized vehicle to initiate a safe stop of the motorized vehicle. The safe stop is performed by the central control unit of the motorized vehicle, in response to receiving the command. The central control unit of the motorized vehicle being stopped can cause an electronic control unit of the motorized vehicle to perform any or all of: disabling a throttle control of the motorized vehicle, applying a braking system of the motorized vehicle, cutting a fuel supply to the engine of the motorized vehicle, and cutting ignition signals to the engine of the motorized vehicle. In an embodiment, there can be a programmable delay between each of these operations, such that the safe stop is performed immediately (zero delay), at a medium speed (e.g. 1 second delay, per safe stop operation) or slowly (e.g. 2 seconds delay, per safe stop operation). In addition, the officer can use the communication system to transmit a command to the central control unit of the motorized vehicle to keep the motorized vehicle in a stopped state, with fuel supply disabled, ignition disabled, throttle control disabled, and brakes fully applied, so that the driver of the motorized vehicle that is now stopped, cannot then drive away. In an embodiment, the officer can use the communication system to transmit a command to re-enable the subsystems of the safely stopped motorized vehicle, such that a driver can the motorized vehicle can operate the motorized vehicle.

In an embodiment, the central control unit of the motorized vehicle can obtain the GPS location of the motorized vehicle and can look up a unique identifier of the driver of the motorized vehicle. The central control unit of the motorized vehicle can also retrieve a predetermined boundary limit on where the motorized vehicle, and/or the driver, can drive the motorized vehicle. In response to approaching a limit on where the driver or motorized vehicle may be driven, a warning message can be displayed to the driver. If the driver continues to drive toward the boundary limit, the central control unit of the motorized vehicle can automatically implement a safe stop of the motorized vehicle. In the safe stop state, the driver may only be able to navigate the motorized vehicle further inside the boundary, and not toward the boundary.

In a fifth embodiment, systems and methods are provided for warning, and/or, reporting a tail-gating driver to the regulatory compliance system. A first motorized vehicle can be followed by a second motorized vehicle. The central control unit of the first motorized vehicle can determine the speed of the first motorized vehicle and a distance from the rear end of the first motorized vehicle to the front end of the second motorized vehicle. If this distance is less than a first threshold amount, in view of the speed of the first and second motorized vehicles, then a warning message to the driver of the second motorized vehicle can be displayed on the rear display of the first motorized vehicle. If this distance is less than a second, unsafe distance, then the central control unit of the first motorized vehicle can instruct a camera in the rear display of the first motorized vehicle to take a picture of the unique machine identifier (license number) of the second motorized vehicle, and optionally take a picture of the driver of the second motorized vehicle. Then, the central control unit of the first motorized vehicle can obtain the GPS coordinates of the first motorized vehicle, the speed of the first motorized vehicle, and transmit the GPS coordinates, picture(s) of the second motorized vehicle, speed information, date/time of the transmission, and other information to the system management center to report the violation of regulatory compliance of the driver of the second motorized vehicle for driving unsafety close to the vehicle in front of it.

In a sixth embodiment, any of the above method operations can be performed on a system that includes a memory programmed with executable instructions, the memory coupled to a processing system having at least one hardware processor, the method operations carried out when the instructions are executed by the processing system. A non-transitory computer-readable medium can store executable instructions that, when executed by a processing system having at least one hardware processor, perform any of the above method operations.

FIG. 1A is a block diagram illustrating a networked system 100 according to one embodiment. The system 100 can include providers of regulatory compliance records 110, a system management center (SMC) 120, subscribers to regulatory compliance records 130 of the system management center 120, motorized vehicles 200, and non-vehicle machines 201 that are subject to various compliance regulations as indicated by providers of regulatory compliance records 110, all interconnected via a network 140.

Providers of regulatory compliance records 110 provide regulatory compliance information to system management center (SMC) 120 as to the state of compliance with regulatory standards of a motorized vehicle (MV) 200, a driver of a motorized vehicle 200, or a non-vehicle machine (NVM) 201, such as a gas pump, an elevator, an escalator, an amusement park ride, or a medical device. Providers of regulatory compliance records 110 can include businesses that provide certification of compliance, or notice of failure of testing for compliance, with an environmental regulation, such as a vehicle emissions standard. A department of motor vehicles (DMV) can be a provider 110 of motorized vehicle 200 regulatory compliance records, such as certificates indicating that a motor vehicle 200 is registered with the DMV and that a license fee has been paid for the motorized vehicle 200. An insurance company can be a provider 110 of certificates of compliance with motorized vehicle insurance regulations.

Non-vehicle machines 201 can also be required to comply with regulations, such as a periodic mechanical inspection, liability insurance, or other regulation. For example, a gasoline pump may be required to be certified, e.g. by a Bureau of Weights and Measures, that the gasoline pump does, or does not, comply with fuel dispensing accuracy standards, fuel dispensing emissions standards, and the like. Such certification can be submitted to the SMC 120 for entry in a regulatory compliance records database, then pushed by a push service down to a central control unit (CCU) inside the certified non-vehicle machine 201. Non-vehicle machines 201, such as an elevator, escalator, or amusement park ride, e.g., may be periodically inspected for safety compliance by an inspector. An inspector's report can be uploaded to SMC 120 as a regulatory compliance record and pushed, by a push service, down to the non-vehicle machine 201.

Other providers 110 of regulatory compliance records can include an authority, such as police, border patrol, park rangers, highway patrol, FBI, CIA, TSA, or other authority may also be a provider of compliance information 110.

System management center (SMC) 120 can receive and store all such regulatory compliance records and index such records for easy retrieval. SMC 120 can receive regulatory compliance records from motorized vehicles 200, such as in the form of a report that the motorized vehicle 200 is being operated at/near a border control point or near a predetermined permissible boundary for operating the motorized vehicle 200, either as a limit on the motorized vehicle 200 or a limit on the driver of the motorized vehicle 200. The motorized vehicle 200 can also provide a report that a license display plate has been removed from the motorized vehicle 200.

Motorized vehicles (MV) 200 can include automobiles of all types including passenger vehicles, trucks, motorcycles, taxi cabs, scooters, boats, and other motorized vehicles.

Non-vehicle machines (NVM) 201 can include a wide variety of machines that are required to comply with regulations, such as gas pump, an elevator, an escalator, an amusement park ride, a utility electric or gas meter, a water meter, liquid natural gas dispenser, or other device that may be inspected for compliance with regulations, including compliance with Bureau or Weights and Measures standards for accuracy.

Each such MV 200 and NVM 201 can have a central control unit (CCU) that receives and stores notifications and updates of compliance records that are relevant to the MV 200 or NVM 201. The stored regulatory compliance records in the CCU of the MV 200 or NVM 201 can be queried by a subscriber 130, such as an enforcement authority.

Subscribers to regulatory compliance records 130 can include a wide variety of entities. Subscribers can include enforcement authorities 130 such as include police, border patrol, customs agencies, Federal Bureau of Investigation (FBI), central intelligence agency (CIA), transportation security administration (TSA), federal and state park rangers, military police, and others who may need access to the state of compliance with regulations of motorized vehicles, drivers of motorized vehicles, and non-vehicle machines. In addition, parties having a vested interest in the state of regulatory compliance of drivers, motorized vehicles 200, or non-vehicle machines 201 may be subscribers 130 to SMC 120. For example, a lending company that issued a loan for a motorized vehicle 200 or non-vehicle machine 201 may require that the recipient of such loan provide proof (a certificate) of collision, property damage, and/or liability insurance on the machine 200/201. The lender may subscribe to SMC 120 to learn of a change of status of whether such MV 200 or NVM 201 has, or does not have, insurance currently in force. Similarly, some military bases require that MV 200 have liability insurance if the MV 200 is driven on such military base. Thus, the military base may be a subscriber 130 to SMC 120 to ensure that a driver of an MV 200 has motor vehicle insurance before permitting the MV 200 on the military base. In addition, the military police at the point of entry to the military base may act as a border patrol. The driver and/or MV 200 may be required to stop the MV 200 at the entry to the military base for a compliance check before entering the military base.

Providers of compliance records 110, SMC 120, subscribers 130, MV's 200, and NVM's 201 may all be interconnected via a network 140. Network 140 can include a cellular network, a mobile telephony network, e.g. GSM, a radio-based network, WiFi, or other network.

Figure 1B:
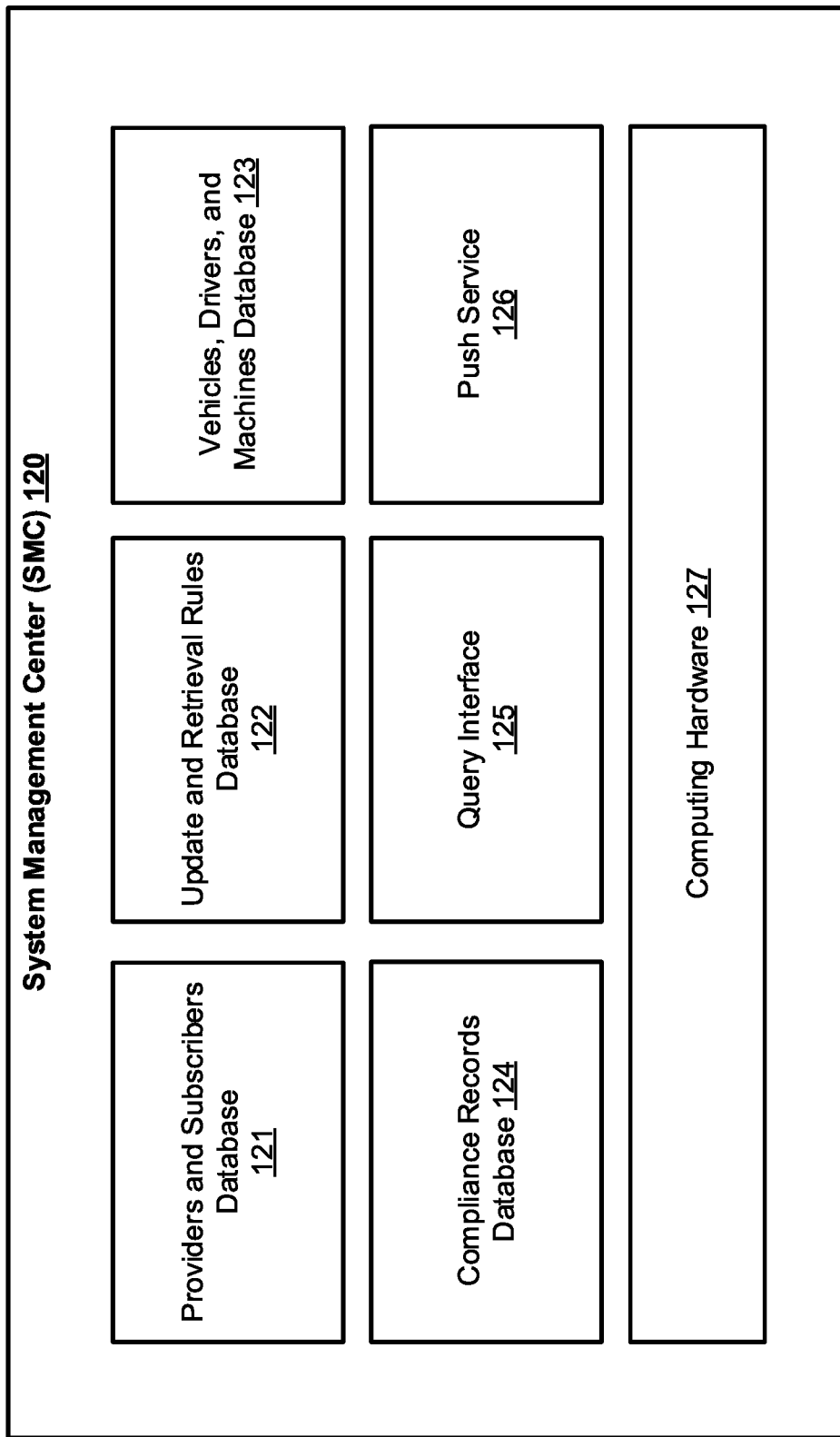
FIG. 1B is a block diagram illustrating a system management center that manages regulatory compliance records for use in the networked system of FIG. 1A, according to some embodiments.

FIG. 1B is a block diagram illustrating a system management center 120 (SMC) that manages regulatory compliance records of MV's 200 and NVM's 201 for use in the networked system 100 of FIG. 1A, according to some embodiments.

SMC 120 can include a plurality of databases 121-124, a query interface 125, a push service 126, and computing hardware 127.

Providers and Subscribers Database 121 can include database records identifying one or more providers of regulatory compliance records 124 and one or more subscribers to those regulatory compliance records 124. A provider is any person or entity that reports to the SMC 120 a state of compliance with regulatory requirements of a motorized vehicle 200, a driver of a motorized vehicle 200, or a non-vehicle machine 201. A subscriber is any person or entity that requests and/or receives regulatory compliance records 124. A subscriber can also request and/or receive regulatory compliance records directly from a motorized vehicle 200 or a non-vehicle machine 201 by querying the central control unit (CCU) in the MV 200 or NVM 201.

A person or entity can be both a provider and a subscriber, within limits set forth in update and retrieval rules database 122. For example, a department of motor vehicles (DMV) can be a provider of licensing compliance records 124 for drivers of motorized vehicles 200 and a provider of registration compliance records 124 or motorized vehicles 200. In many states, an motorized vehicle 200 registration requires proof of liability insurance and proof of compliance with motorized vehicle emissions standards ("emissions certification"). An insurer of motorized vehicles is a provider that provides a certificate of insurance (record of compliance) that a particular driver and motorized vehicle 200 complies with property damage and liability insurance requirements to register the motorized vehicle 200 for operation on public roads. An emissions certification business can be a provider of regulatory compliance records 124 that a particular motorized vehicle 200 complies with emissions standards for operation on public roads. The DMV, in addition to being a provider of driver license and vehicle registration records, can also be a subscriber of environmental compliance records and insurance compliance records for a motorized vehicle 200 and/or a driver of a motorized vehicle. A lender that provided a loan for a driver to purchase a motorized vehicle 200 may also require insurance on the motorized vehicle 200 to protect the lender against loss due to damage to the vehicle. The lender can be a subscriber to regulatory compliance records 124.

A non-vehicle machine (NVM) 201 can also be subject to regulatory compliance. For example, an elevator, an escalator, utility meter, medical device, or an amusement park ride are subject to periodic inspections of the machines and their maintenance records. A date upon which each such inspection has been performed can be uploaded to compliance records database 124 and pushed, by push service 126, down to a central control unit (CCU) of the non-vehicle machine (NVM) 201. Each NVM 201 can be identified in vehicles, drivers, and machines database 123 with a unique identifier. A display on the NVM 201 can display the current regulatory compliance status of the NVM 201, allowing a user to decide whether to utilize the NVM 201. In an embodiment, an NVM 201 that does not comply with regulatory requirements can automatically disable itself. In an embodiment, an NVM 201 may include a user interface that allows a user to temporarily override the automatic disabling of the NVM 201 so that the user can use the NVM 201. For example, a gasoline pump display may indicate that the gasoline pump is non-compliant with a required annual certification that the amount of gasoline displayed to a consumer accurately represents the amount of gasoline dispensed to the consumer. If the certification of accuracy has expired, the gasoline pump may then disable itself and the CCU of the gasoline pump can update a display of the gasoline pump to indicate the non-compliant status of the gasoline pump. A consumer that urgently needs gasoline may not be concerned with the non-compliant status of the gasoline pump, and may use a manual override interface to accept the non-compliant status of the gasoline pump and go ahead with using the gasoline pump regardless of its non-compliant status. The user's manual override may be indicated on a receipt issued to the user for purchase of gasoline using the non-compliant gasoline pump.

Update and retrieval rules 122 can define the specific regulatory compliance records 124 which providers are permitted to update in the compliance records database 124. Update and retrieval rules 122 can also define the specific regulatory compliance records 124 which subscribers are permitted to receive. In an embodiment, update and retrieval rules 122 can set forth fees to be paid by subscribers 121 for receipt of updates to regulatory compliance records 124. In an embodiment, update and retrieval rules 122 can set forth specific information and specific subscribers that can receive regulatory compliance records 124 by a push service 126. Update and retrieval rules 122 can also define the specific information which providers or subscribers are permitted to retrieve and/or update from a central control unit (CCU) in a motor vehicle 200 or non-vehicle machine 201. A motor vehicle 200 or a non-vehicle machine 201 can be a push service subscriber to regulatory compliance records 124 that relate to the particular MV 200 or NVM 201.

A vehicle, driver, and machine database 123 can store a record of each motorized vehicle 200, driver of a motorized vehicle 200, and non-vehicle machine 201 for which regulatory compliance records 124 are provided. Each MV 200, driver of an MV 200, and NVM 201 may have one or more unique identifiers associated with it, as well as other identifying information. For example, an MV 200 may a unique identifier, a registered owner, a manufacturer's make and model number, a vehicle identification number (VIN), a year of manufacture, and a color associated with it. A driver of an MV 200 may have a unique identifier (e.g. vehicle operator's license number), a current residence address, an age of the driver, height and weight of the driver, eye color of the driver, whether the driver is required to wear corrective lenses when operating an MV 200, and one or more classifications of motorized vehicles 200 that the driver is permitted to operate. An NVM 201 can have a description of the non-vehicle machine 201 (escalator, elevator, medical device, utility meter, amusement park ride, gasoline pump, e.g.), a manufacturer's name and model number, a year of manufacture, a registered owner of the NVM 201, a residential or business address of the registered owner, and the like. Vehicles, drivers, and machines database 123 can be cross-indexed with compliance records 124, providers and subscribers 121, and update and retrieval rules 122.

Push service 126 can send an updated regulatory compliance record 124 to one or more subscribers, without the push service 126 receiving an explicit request for the updated regulatory compliance record 124. Push service 126 can receive a notification that a regulatory compliance record 124 for a motorized vehicle 200, driver of a motorized vehicle 200, or non-vehicle machine 201 has been updated. Push service 126 can access the update and retrieval rules 122 to determine which subscriber, if any, is permitted to receive the updated regulatory compliance record 124 by push service 126. Push service 126 can push the updated regulatory compliance record 124 to the subscriber(s) that are permitted to receive the updated regulatory compliance record 124 from push service 126. For example, a motorized vehicle 200 can receive, by push service 126, an update to the regulatory compliance status of the motorized vehicle 200. Each non-vehicle machine 201 can receive an update from push service 126 to the regulatory compliance status of the non-vehicle machine 201. In an embodiment, a law enforcement agency may submit a request to receive push service 126 for regulatory compliance records 124 for a particular motorized vehicle 200, driver of a motorized vehicle 200, or non-vehicle machine 201. For example, the law enforcement agency may have received notification that a specific motorized vehicle 200 has been stolen or was involved in an accident, and the law enforcement agency may receive push notifications regarding that motorized vehicle 200 and/or a driver of that motorized vehicle 200. In an embodiment, a law enforcement agency request for push service may be temporary in scope, such as 24 hours or 30 days. Such a request for push service can be stored in the update and retrieval rules database 122.

In an embodiment, a law enforcement agency can be both a provider of compliance records and a subscriber to the regulatory compliance database 124. For example, the law enforcement agency may act as a provider by submitting a regulatory compliance record 124 indicating that a specified driver has received a citation for a serious felony, and that an arrest warrant for the driver has been issued. The record of the serious felony and the arrest warrant can be pushed by push service 126 to the motorized vehicle 200 and stored in the central control unit (CCU) of the motorized vehicle 200. A law enforcement agency (the same, or a different agency) can query the regulatory compliance records stored in the CCU of the motorized vehicle 200 and find out that an arrest warrant has been issued for the driver of the motorized vehicle 200.

System management center (SMC) 120 can further include a query interface 125. A query can specify the subscriber issuing the query, or can be an anonymous and/or non-subscriber query. For a subscriber query, query interface 125 can access the providers and subscribers database 121, and update and retrieval rules database 122, to determine the regulatory compliance records 124 that the subscriber is permitted to access. Query interface 125 can then parse the query to determine the regulatory compliance records 124 that are requested in the query. If the subscriber is permitted to access the requested regulatory compliance records 124 then the requested regulatory compliance records 124 are returned in response to the query. If the subscriber is permitted to access some, but not all, of the requested regulatory compliance records, then none of the requested records are returned. In an embodiment, only the requested regulatory compliance records 124 that the subscriber is entitled to receive are returned. In an embodiment, a notice is returned to the querying subscriber as to the regulatory compliance records 124 that were requested, but not returned, to the user.

A non-subscriber may use query interface 125 to request public regulatory compliance records 124, such as the inspection and maintenance records of a non-vehicle machine 201. For example, a gasoline pump ("gas pump") is required to be inspected and certified for accuracy of the delivered gasoline as compared to the displayed amount of dispensed gasoline. An anonymous non-subscribing user may query the regulatory compliance records 124 of the gas pump to determine the history of compliance of this particular gas pump with dispensing accuracy requirements. In an embodiment, the query interface can enable a non-subscribing user to query for gasoline pumps that are in compliance with regulatory requirements 124 and that are near to the gasoline pump for which the user issued the query.

System management center (SMC) 120 can include computing hardware 127. Exemplary hardware for SMC 120 can be as described below with reference to FIG. 13. In an embodiment, SMC 120 can comprise a distributed computing platform, and/or cloud storage or distributed storage, comprising many instances of computing hardware.

Figure 2B:
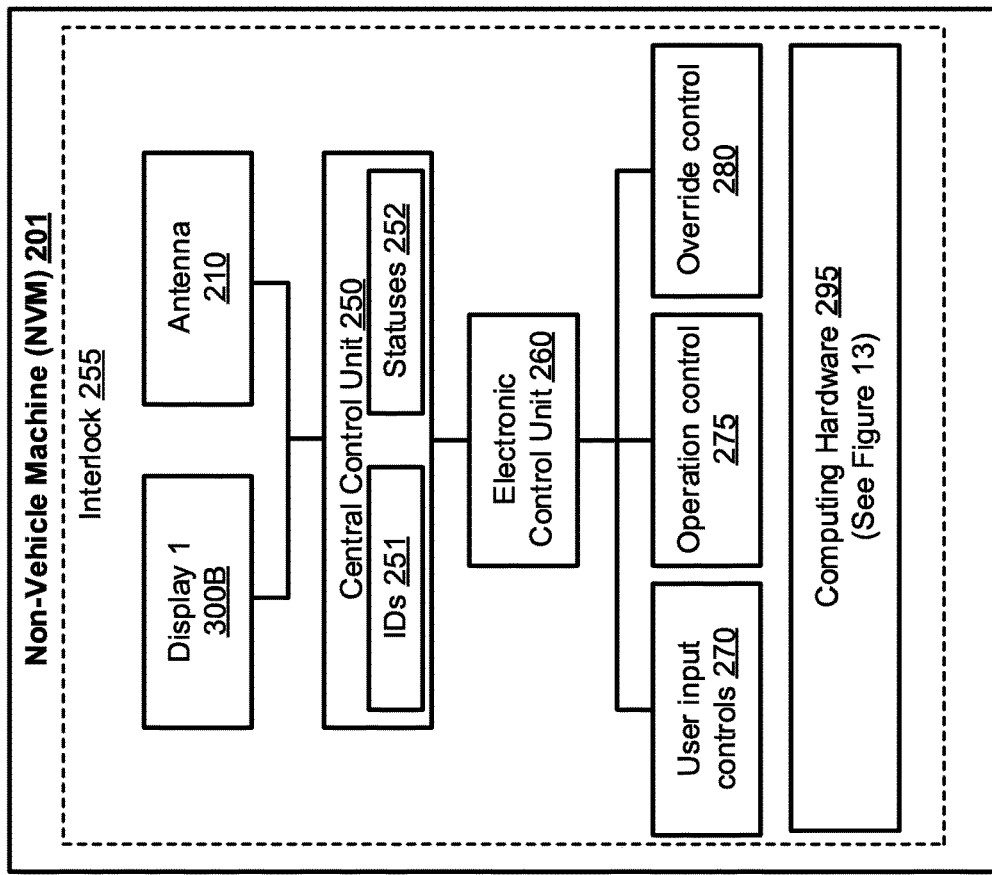
FIG. 2B is a block diagram illustrating an example of subsystems of a non-vehicle machine for use with a system that determines and displays regulatory compliance of the non-vehicle machine and can control operation of the non-vehicle machine, according to one embodiment.
Figure 2A:
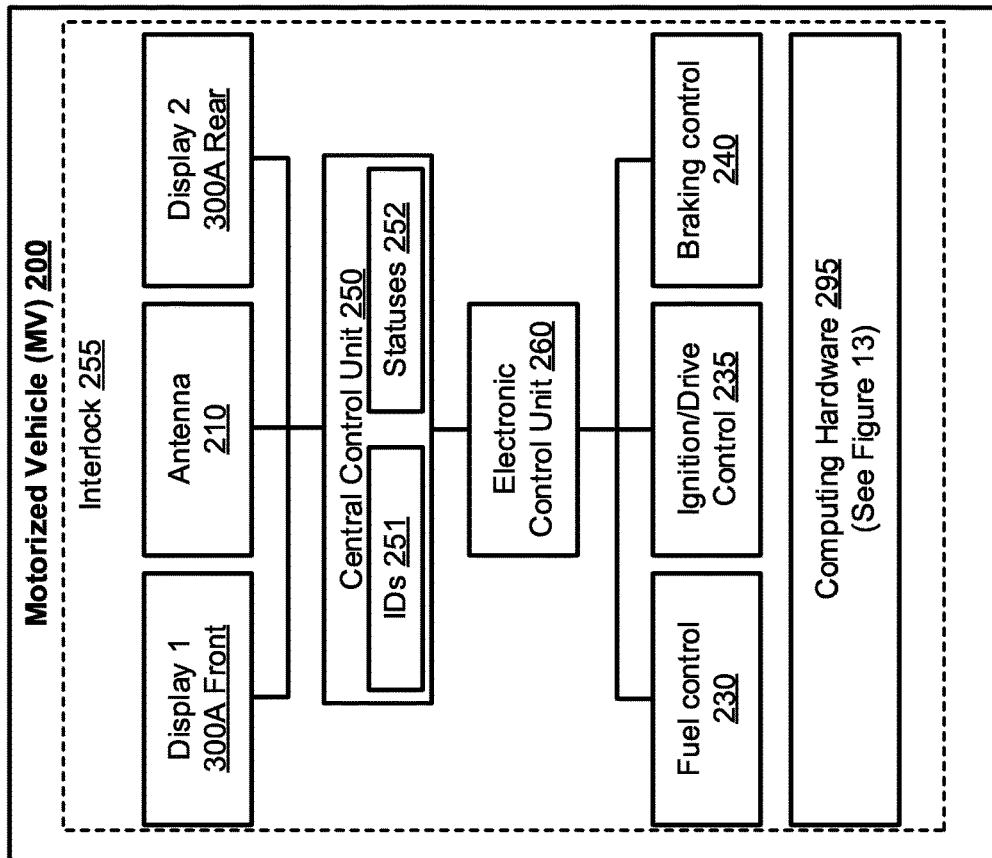
FIG. 2A is a block diagram illustrating an example of subsystems of a motorized vehicle for use with a system that determines and displays regulatory compliance of a motorized vehicle that can be remotely stopped by an authority, according to one embodiment.

FIG. 2A is a block diagram illustrating an example of subsystems of a motorized vehicle 200 for use with a system that determines and displays regulatory compliance of a motorized vehicle 200 and that can be remotely stopped by an authority, according to one embodiment. The described systems enable a motorized vehicle (MV) 200 to receive and store regulatory compliance records from SMC 120, display a regulatory compliance status of the MV 200 on one or more displays, enable a law enforcement agency to query the received and stored regulatory compliance records, and enable law enforcement agency to automatically and remotely stop the MV 200. The subsystems also enable the operation of MV 200 to be disabled so that a driver of the MV 200 cannot drive away, once the MV 200 is stopped.

A motorized vehicle (MV) 200 can include one or more displays 300A, an antenna 210, a central control unit (CCU) 250, an electronic control unit (ECU) 260, a fuel control module 230, an ignition control module 235, braking control module 240, and computing hardware 295.

A unique identifier of each subsystem can be registered with the CCU 250 and stored in the IDs 251 storage off CCU 250. Subsystems of MV 200 can be interlocked 255 such that, e.g., at startup of the MV 200, each subsystem is checked that (1) the subsystem responds to queries by the CCU, and (2) each subsystem returns the correct identifier in response to a CCU 250 query. If any subsystem does not respond, or has the incorrect serial number, the CCU 250 will not allow the MV 200 to start. After startup, interlocking components ensures that, e.g., a subsystem cannot be removed, such as stealing the license plate or removing a display when the vehicle displays a non-compliant status. In an embodiment, if the interlock 255 is violated after the MV 200 is started, the MV 200 will be disabled. In an embodiment, if the interlock 255 is violated after the MV 200 is moving, the CCU 250 will automatically initiate a safe stop.

Displays 300A (front and rear) can display, among other data, a status of regulatory compliance of the MV 200, a state and/or country with which the MV 200 is registered, a license plate number of the MV 200, and other display information. Display(s) 300A are described in further detail, below, with reference to FIG. 3A.

Antenna 210 can be a radio antenna, a WiFi antenna, a cell phone antenna, a satellite communication antenna, or antenna for another communication medium or protocol. Antenna 210 can enable MV 200 to receive and store regulatory compliance records from SMC 120. Antenna 210 can also receive inquiries and commands from a law enforcement agent. Inquiries can include "return MV 200 identification number" and "return motorized vehicle regulatory compliance records from central control unit storage." Inquiries can also include "driver key ID and driver regulatory compliance records."

Central control unit (CCU) 250 is the central logic and storage unit for the MV 200. CCU 250 can receive regulatory compliance records from SMC 120 and store the updated records in statuses storage 252. CCU 250 can then update the regulatory compliance status of the MV 200 on one or both of displays 300A. Each MV 200 can have one or more MV 200 operation keys. An operation key is a physical, electronic device that includes a radio frequency identifier (RFID). The operational key can include identification of one or more drivers that are authorized to use the operation key to operate the MV 200. The RFID of each such key, and a list of authorized drivers for each operation key, is stored in the IDs storage 251 of CCU 250. Computer hardware 295 can include an RFID reader that reads the RFID of the operational key. If the RFID of the operational key is not stored in the IDs storage 251, the operational key will not be able to operate the MV 200. A law enforcement agent querying the status of the MV 200 can receive the RFID of the operational key from the CCU 250 and the regulatory compliance records of each of the one or more drivers associated with the operational key.

CCU 250 can include logic to implement a safe stop of the MV 200 in response to a command received from a law enforcement agent. In an embodiment, a safe stop command can be a slow, medium, or immediate safe stop. A slow safe stop may have a delay of, e.g., 2 seconds between each operation of the safe stop. A medium safe stop may have a delay of, e.g., 1 second between each operation of the safe stop. An immediate safe stop may have no delay between operations of the safe stop. Operations of the safe stop can include: disable throttle, cut fuel flow to the ignition system, cut ignition signals to the ignition system, and apply brakes. Each of the these operations, and associated delays, if any, can be implemented by a combination of the CCU 250 and electronic control unit (ECU) 260. ECU 260 can control the operation of a fuel control system 230, an ignition/driver control system 235, and a braking module 240. When a driver operates a motorized vehicle 200, the driver will control the MV 200 with manual inputs into a steering wheel, a gas pedal/accelerator, and a brake pedal. These manual inputs are received by ECU 260 and translated into electro-mechanical inputs to the fuel control 230, ignition/drive control 235, and braking control 230.

Features of the MV 200 subsystems, described above, can be implemented by computing hardware 295, programmed with executable instructions, stored in a storage of the computing hardware 295, to implement the described functionality.

FIG. 2B is a block diagram illustrating an example of subsystems of a non-vehicle machine 201 for use with a system that determines and displays regulatory compliance of the non-vehicle machine 201 and can control operation of the non-vehicle machine, according to some embodiments. The described systems enable a non-vehicle machine (NVM) 201 to receive and store regulatory compliance records from SMC 120, display a regulatory compliance status of the NVM 201 on one or more displays, enable querying of the NVM 201 of the received and stored regulatory compliance records by authorized subscribers and/or the general public. The subsystems also implement disablement of the NVM 201 when the NVM 201 is non-compliant with required regulations. In an embodiment, a non-compliant, disabled NVM 201 can be temporarily enabled by a user in response to user override and acceptance that the NVM 201 is currently non-compliant.

An NVM 201 can include one or more displays 300B, an antenna 210, a central control unit (CCU) 250, an electronic control unit (ECU) 260, a user interface 270, operational controls 275, override control 280, and computing hardware 295.

A unique identifier of each subsystem can be registered with the CCU 250 and stored in the IDs 251 storage. Subsystems of NVM 201 can be interlocked 255 such that, e.g., when the NVM is initialized for operation, each subsystem is checked that (1) the subsystem responds to queries by the CCU 250, and (2) each subsystem returns the correct identifier in response to a CCU 250 query. If any subsystem does not respond, or if the subsystem has the incorrect identifier, the NVM 201 will become operational. After startup, interlocking 255 of subsystems ensures that, e.g., a subsystem cannot be removed, such as removing a display 300B when the NVM 201 displays a non-compliant status. In an embodiment, if the interlock 255 is violated after the NVM 201 is operational, the NVM 201 will be disabled.

Displays 300B can display, among other data, a status of regulatory compliance of the NVM 201, a state and/or country with which the NVM 201 is registered, a last date that the NVM 201 was certified as compliant with regulations, and operational controls for the NVM 201, operational information, and other display information. Display(s) 300B are described in further detail, below, with reference to FIG. 3B.

Antenna 210 can be a radio antenna, a WiFi antenna, a cell phone antenna, a satellite communication antenna, or antenna for another communication medium or protocol. Antenna 210 can enable NVM 201 to receive and store regulatory compliance records from SMC 120. Antenna 210 can also receive inquiries from authorized subscribers and non-subscribing users. Inquiries can include "return NVM 201 identification number" and "return NVM 201 regulatory compliance records from CCU 250 statuses 252." Inquiries can also include "return locations of compliant NVM 201's that are near this location."

Central control unit (CCU) 250 is the central logic and storage unit for the NVM 201. CCU 250 can receive regulatory compliance records from SMC 120 and store the updated records in statuses storage 252. CCU 250 can then update the regulatory compliance status of the NVM 201 on one or more displays 300B.

Electronic control unit (ECU) 260 can control user inputs to the NVM 201, operational control 275 of the NVM 201, and user override control 280 of the NVM 201. User inputs 270, operation control 275, and override control 280 will vary depending upon the specific NVM 201. Example use cases are described below.

Gasoline Pump

A gasoline pump may be subject to regulatory compliance, such as requiring periodic certification that the gasoline pump accurately dispenses the same amount of fuel as it displays on display 300B, or requiring periodic emissions inspection to ensure that emissions control equipment of the gasoline pump is working in accordance with regulations. Upon inspection and certification of compliance, a status of compliance can be received by CCU 250 from SMU 120, stored in CCU 250 statuses storage 252, and the updated compliant status can be displayed on display 300B. If the gasoline pump is not re-inspected before the expiration date of the inspection, the status will automatically become "non-compliant" and display 300B will be updated. When the gasoline pump status is "compliant with regulations," a user interacts with the gasoline pump via user input controls 270 and the gasoline pump operation is controlled via operational control 275. When the gasoline pump status changes to "non-compliant," and thus the CCU 250 of the gasoline pump disables the gasoline pump from further use, a user may wish to accept the non-compliant status and use the gasoline pump anyway. The user interacts with the gasoline pump via user input controls 270, and selects override control 280 to override non-compliant status. The gasoline pump operation is then controlled via operation control 275.

Elevator

An elevator requires periodic safety inspection and maintenance. When such inspection and maintenance is performed, a certification of compliance is sent to SMC 120 by a provider, the certification of compliance is pushed to the elevator CCU 250, stored in CCU 250 statues storage 252, and the CCU 250 updates display 300B to indicate that the elevator is compliant with regulatory requirements. A user interacts with the elevator via user input controls 270, such as "door open," "up/down select," and "select floor" et al. If the elevator is not recertified within a specified period of time, then elevator will automatically display "non-compliant" status, which may include a data that compliance was last certified, e.g. When the elevator is in "non-compliant" status, the elevator may automatically set itself to disable operation. A user may, or may not, want to override disabled operation of the elevator, depending upon whether the user wants to assume the responsibility of risk of injury due to elevator failure. Logic in the CCU 250 and ECU 260 may determine a reason that the elevator is in a disabled state, such as disabled due to failure of a subsystem or that that elevator compliance has been expired for 1 day, due to lack or recertification. The logic may determine the extent to which disabled state can be overridden, if at all. Override control 280 can implement a limited override of disabled status, as may be permitted by CCU/ECU logic, and the acceptance of liability by the user via user controls 270.

Features of the NVM 201 subsystems, described above, can be implemented by computing hardware 295, programmed with executable instructions, stored in a storage of the computing hardware 295, to implement the described functionality.

Figure 3C:
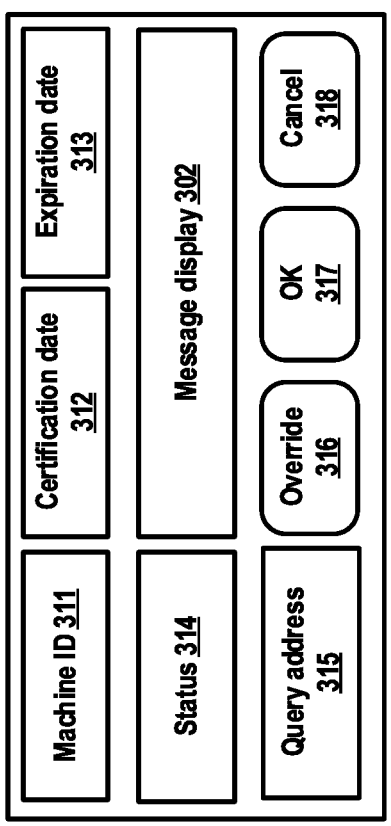
FIGS. 3A-3C are block diagrams illustrating example displays for use with a system that determines and displays regulatory compliance of status of motorized vehicles and/or non-vehicle machines according to some embodiments.
Figure 3A:
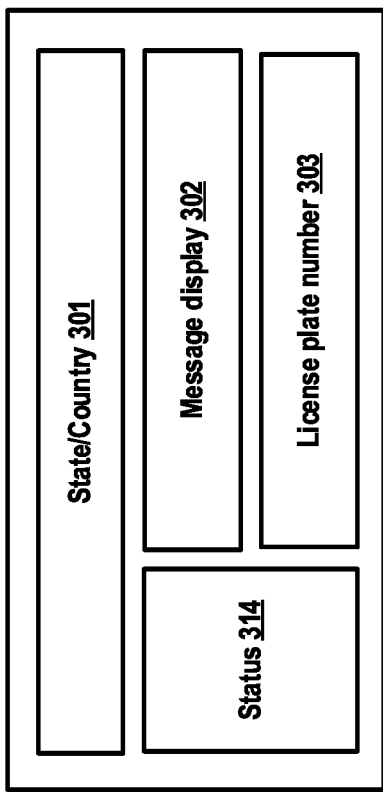
Figure 3B:

FIGS. 3A-3C are block diagrams illustrating example displays 300A and 300B for use with a system that determines regulatory compliance of motorized vehicles 200 and non-vehicle machines 201, according to some embodiments. Displays are coupled to CCU 250 as shown in FIGS. 2A and 2B, above. Compliance status information, and other displayed information, can be obtained from CCU 250 status storage 252 and IDs storage 251, which contain regulatory compliance information received from SMC 120, via CCU 250. Displays can be LED's, segmented LEDs, LCD display, or other display technology. In an embodiment for a motorized vehicle 200, one or more of displays 300A may be embedded in the front or rear windshield of the motorized vehicle.

FIG. 3A is an example front display for use on a motorized vehicle (MV) 200. Front display 300A can include a displayed state/country 301 in which MV 200 is, or was, registered. In the event of a change of state or country in which the MV 200 is registered, CCU 250 of MV 200 receives and stores an updated compliance record in statuses storage 252, and the updated status is displayed on state/country 301 display element.

Status 314 can be a single multi-color display wherein the displayed color indicates the regulatory compliance status of the MV 200. In addition, or alternatively, status 314 be a multi-segment color control bar display, or be a number or code display indicating regulatory compliance status. For example, status 314 can display a RED color in the event that a serious aspect of the MV 200 or driver of the MV 200 (e.g. stolen vehicle) is non-compliant with regulations and can display GREEN if the MV 200 and driver are fully compliant with regulations, otherwise the status 314 is set to YELLOW meaning that some aspect of the MV 200 or driver is non-compliant with regulations. In an embodiment, status 314 can be a multi-color LED, performing a functionality analogous to the one-color-at-a-time LED. In an embodiment, status 314 can display one or more status codes indicating the specific aspect(s) of non-compliance with regulations of the MV 200 or driver. In an embodiment, status codes and colors can be combined, such that one or more status codes are displayed, one at a time, over a background color that follows the color scheme described above.

Message display 302 of MV 200 front display 300A can display a message that supplements one or more of the status codes displayed in status 314.

License plate number 303 can display the license plate number for this MV 200 issued by a department of motor vehicles (DMV). The license plate number can be provided to SMC 120 by DMV as a provider, then pushed to the MV 200 using push service 126, stored in the statuses memory 252 of CCU 250 of the MV 200, then displayed on the front display of the MV 200.

In an embodiment for a law enforcement MV 200, the front display 300A can include an emitter-receiver 307 and camera 306 as described below with reference to FIG. 3B 300A motor vehicle rear display. The camera 306 can be used by a law enforcement MV 200 from display 300A to capture the motor vehicle identification number of an MV 200 that the law enforcement agent determines may be out of regulatory compliance. Alternatively, emitter-receiver 307 of the front display 300A can scan the front or rear display of the MV 200 to capture the vehicle identification number of the MV 200 that the law enforcement agent determines may be out of regulatory compliance. In an embodiment, the camera 306 and/or emitter-receiver 307 can be a part of a handheld device, such as a Smartphone or scanner, to obtain the vehicle identification number of an MV 200. An application in the smart phone or scanner can then send a command to the MV 200 to obtain the regulatory compliance records stored in the CCU 250 of the MV 200 that the law enforcement agent determines may be out of regulatory compliance. The obtained records can then be stored in the handheld device for review by the law enforcement agent.

FIG. 3B is an example rear display 300A for use on a motorized vehicle (MV) 200. Rear display 300A can include a displayed state/country 301 in which MV 200 is, or was, registered. In the event of a change of state or country in which the MV 200 is registered, CCU 250 of MV 200 receives and stores an updated compliance record in statuses storage 252, and the updated status is displayed on state/country 301 display element of rear display 300A.

Status 314 can be a single multi-color display wherein the displayed color indicates the regulatory compliance status of the MV 200. In addition, or alternatively, status 314 be a multi-segment color control bar display, or be a number or code display indicating regulatory compliance status. For example, status 314 can display a RED color in the event that a serious aspect of the MV 200 or driver of the MV 200 (e.g. stolen vehicle) is non-compliant with regulations and can display GREEN if the MV 200 and driver are fully compliant with regulations, otherwise the status 314 is set to YELLOW meaning that some aspect of the MV 200 or driver is non-compliant with regulations. In an embodiment, status 314 can be a multi-color LED, performing a functionality analogous to the one-color-at-a-time LED. In an embodiment, status 314 can display one or more status codes indicating the specific aspect(s) of non-compliance with regulations of the MV 200 or driver. In an embodiment, status codes and colors can be combined, such that one or more status codes are displayed, one at a time, over a background color that follows the color scheme described above.

Message display 302 of MV 200 rear display 300A can display a message that supplements one or more of the status codes displayed in status 314. In an embodiment, message display 302 can display a message to a car behind the MV 200, e.g., "Too Close," "Speed Limit 35 mph," "Stopped vehicle ahead," or "School Zone," to notify the driver behind the MV 200 of a risky driving situation.

License plate number 303 can display the license plate number for this MV 200 issued by a department of motor vehicles (DMV). The license plate number can be provided to SMC 120 by DMV as a provider, then pushed to the MV 200 using push service 126, stored in the statuses memory 252 of CCU 250 of the MV 200, then displayed on the front display of the MV 200.

Rear display 300A, on a first MV 200, can include an Emitter/Receiver 307 that can emit a range-finding signal, such as an infrared laser pulse, toward a second MV 200 immediately behind the first MV 200. Receiver 307 can receive a reflection of the emitted range-finding signal and determine a distance between the rear of the first MV 200 and the front of the second MV 200. Logic in the CCU 250 can determine a distance and speed relationship that estimates whether the second MV 200 is driving too close to the rear of the first MV 200. If so, then the first MV 200 can display a warning message on message display 302, e.g. "Too Close" or other message to indicate that the second MV 200 is driving too close to the first MV 200. In an embodiment, the flashing light can include flashing the tail lights of the MV 200. In addition, or alternatively, flashing light 305 can flash indicating to the driver of the second MV 200 that the driver is driving too close to the first MV 200. If the second MV 200 continues to drive too close to the rear of the first MV 200, camera 306 of the rear display 300A of the first MV 200 can take a picture of the second MV 200. The picture may include the front display 300A of the second MV 200, and/or a picture of the driver. The picture, speed of the first motorized vehicle MV 200, distance between the rear of the first MV 200 and front of second MV 200 can be transmitted to a law enforcement agent and/or to SMC 120 to update the regulatory compliance records of the second MV 200 and/or the driver of the second MV 200 to indicate the unsafe driving. In an embodiment, a GPS location of the first MV 200 and a date/time of the picture can also be transmitted to a law enforcement agency and/or SMC 120.

FIG. 3C is an example display 300B for use on a non-vehicle machine (NVM) 201. An NVM 201 can include a wide variety of machines that are subject to regulatory compliance, such as a gasoline pump, an elevator, an escalator, or FDA-controlled medical devices such as medical and dental lasers, and blood transfusion machinery. NVM 201 can include any device that is subject to measurement accuracy regulations by a Bureau of Weights and Measures, such as a utility natural gas usage meter, a utility electricity usage meter, a utility electricity production meter for a solar system, a fuel cell hydrogen dispensing device, or a propane dispensing device.

An NVM 201 display 300B can have display elements for a unique machine identifier 311 of the NVM 201, a certification date 312 display the date that the NVM 201 was last certified as compliant with regulations, and an expiration date display 313 which displays a date that the current certification of compliance expires.

NVM 201 display 300B can further includes a status 314 display element having a color, indicating the regulatory compliance status of the NVM 2010, a multi-segment control bar display, or number or code indicating regulatory compliance status. For example, status 314 can display be set to a RED color in the event that a serious aspect of the NVM 201 is non-compliant with regulations and can display GREEN if the NVM 201 is fully compliant with regulations. Otherwise the status 314 is set to YELLOW meaning that some aspect of the NVM 201 is non-compliant with regulations. In an embodiment, status 314 can be a multi-color LED, performing a functionality analogous to the single color LED. In an embodiment, status 314 can display one or more status codes indicating the specific aspect(s) of non-compliance with regulations of the NVM 201. In an embodiment, status codes and colors can be combined, such that one or more status codes are displayed, one at a time, over a background color that follows the color scheme described above.

Message display 302 of NVM 201 display 300B can display a message that supplements one or more of the status codes displayed in status 314. In an embodiment, message display 302 can display a message to a user, "Machine inspection out of date," "Machine certification service called," or "Machine operation disabled" to notify a user of the reason that an NVM 201 is not operable.

Display 300B for an NVM 201 can include a query address display 315 that indicates where and/or how a user can query the regulatory compliance history of the NVM 201. In an embodiment, query address 315 can be a uniform resource locator (URL) of a query interface of the status memory 252 of the central control unit 250 of the non-vehicle machine 201, or a query address of system management center 120. In an embodiment, query address 315 can be a QR code for querying central control unit 250 of the non-vehicle machine 201, or the query address of the system management center 120.

In some embodiments, an NVM 201 can automatically disable its own operation when the NVM 201 is non-compliant with regulations. For example, it is unlawful to operate some medical machines when the machines are not in full regulatory compliance. Central control unit 250 of NVM 201 can read its own statuses storage 252 and determine whether to automatically disable operation of itself from use.

In some embodiments, e.g. a gasoline pump, a user of the NVM 201 may be able to perform a limited override of a state of disablement of the NVM 201. A user of the gasoline pump may have an urgent need for gasoline and may not care whether or not the gasoline dispensing accuracy has not been recertified recently. The user of the gasoline pump may use the override 316 control to temporarily enable the gasoline pump. OK 317 and Cancel 318 buttons may assist the user in navigating override operation of the gasoline pump.

Figure 4:
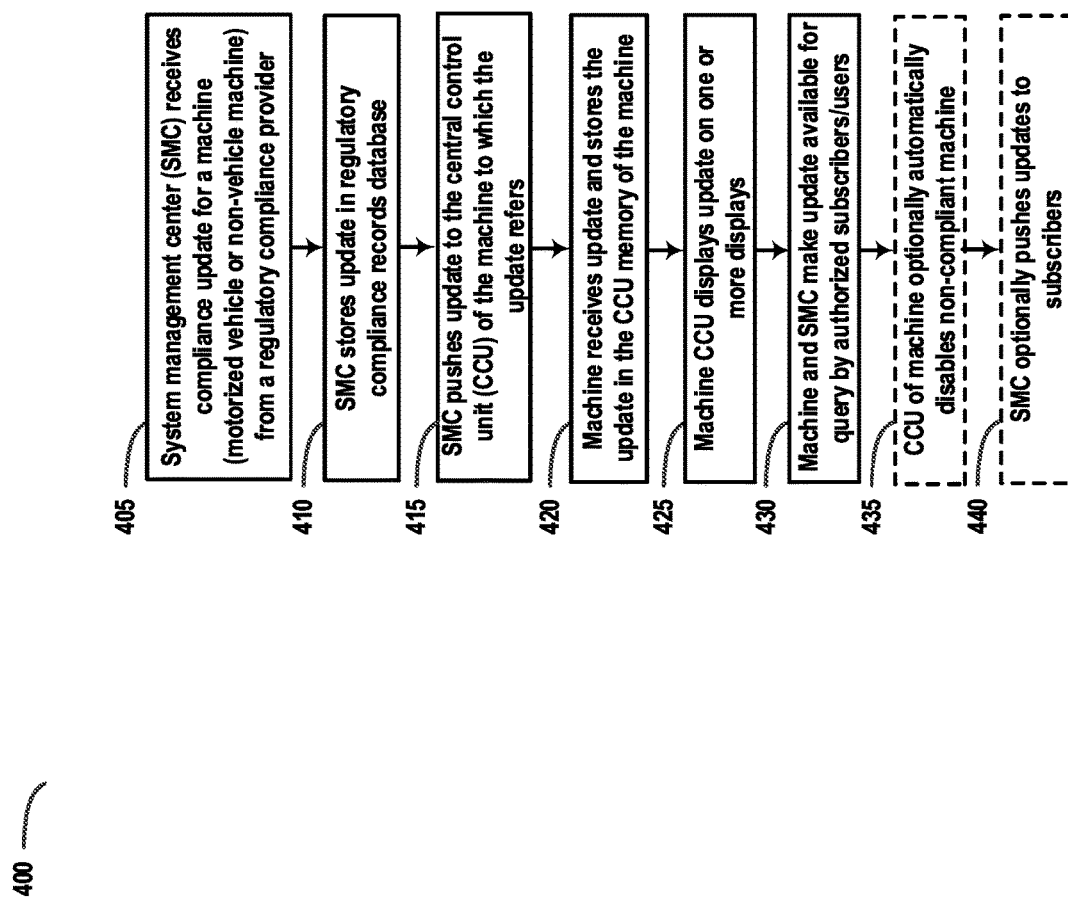
FIG. 4 is a block diagram illustrating a method of updating a central control unit of a motorized vehicle or non-vehicle machine with regulatory compliance information, according to some embodiments.

FIG. 4 is a block diagram illustrating a method 400 of updating a central control unit (CCU) 250 of a motorized vehicle (MV) 200 or non-vehicle machine (NVM) 201 with regulatory compliance information received from a system management center (SMC) 120, according to some embodiments. SMC 120 can also update MV 200 central control unit 250 with changes in regulatory compliance status for drivers of the MV 200 that hold one or more keys that are registered in the central control unit 250 of the MV 200.

In operation 405, system management center (SMC) 120 can receive an update to a regulatory compliance record for a motorized vehicle 200 or a non-vehicle machine 201 (generically, "machine") or a driver (generically, "driver") associated with a motorized vehicle 200. The regulatory compliance record can be received by SMC 120 from any provider 121 that is authorized by update and retrieval rules 122 to update a compliance record 124 for the machine or driver 123 for which the regulatory compliance record is submitted to the SMC 120.

In operation 410, if the provider 121 is authorized to update the regulatory compliance records 124 for the machine or driver 123, then SMC 120 can store the received regulatory compliance record in compliance records database 124.

In operation 415, SMC 120 can access the update and retrieval rules 122 to determine which subscribers 121 and machines (200 or 201) are authorized to receive the update to the regulatory compliance received 124 received by SMC 120 in operation 405. SMC 120 can use push service 126 to push the update to those subscribers 121 authorized to receive the update.

In operation 420, the central control unit 250 of the machine (200 or 201) receives the updated regulatory compliance record from the SMC 120 and stores the received regulatory compliance record in the central control unit (CCU) 250 statuses storage 252 for access by the CCU 250 of the machine (200 or 201).

In operation 425, the machine CCU 250 updates the display(s) (300A or 300B) to reflect the updated status of regulatory compliance received from SMC 120.

In operation 430, the CCU 250 of the machine (200 or 201) and the SMC 120 make the updated regulatory compliance record(s) available to those subscribers who are entitled to receive the updated regulatory compliance record(s) in accordance with update and retrieval rules 122. In an embodiment, for a non-vehicle machine 201, regulatory compliance records may be available to the general public, or anonymous subscribers, in addition to subscribers defined in update and retrieval rules 122. For a motorized vehicle 200, access to driver and vehicle regulatory compliance records may be limited to law enforcement agencies, and others in accordance with rules in update and retrieval rules 122.

In operation 435, CCU 250 of the machine (200 or 201) optionally enforces an automatic disablement of the machine (200 or 201), depending upon machine-specific or driver-specific rules. The logic as to whether to perform an automatic disablement of a machine (200 or 201) can be programmed into the CCU 250 or defined by regulatory requirements. For example, certain medical machines that are subject to government regulations may be mandated that they not be used in the event of a non-compliant regulatory status of the machine. Similarly, a driver with a particularly bad driver record may have a license that is subject to a probationary status, such that if terms of the probation are violated, the motor vehicle 200 can be automatically disabled.

In operation 440, SMC 120 optionally pushes updates to subscribers 121 that are authorized to receive push updates, in accordance with update and retrieval rules 122.

Figure 5:
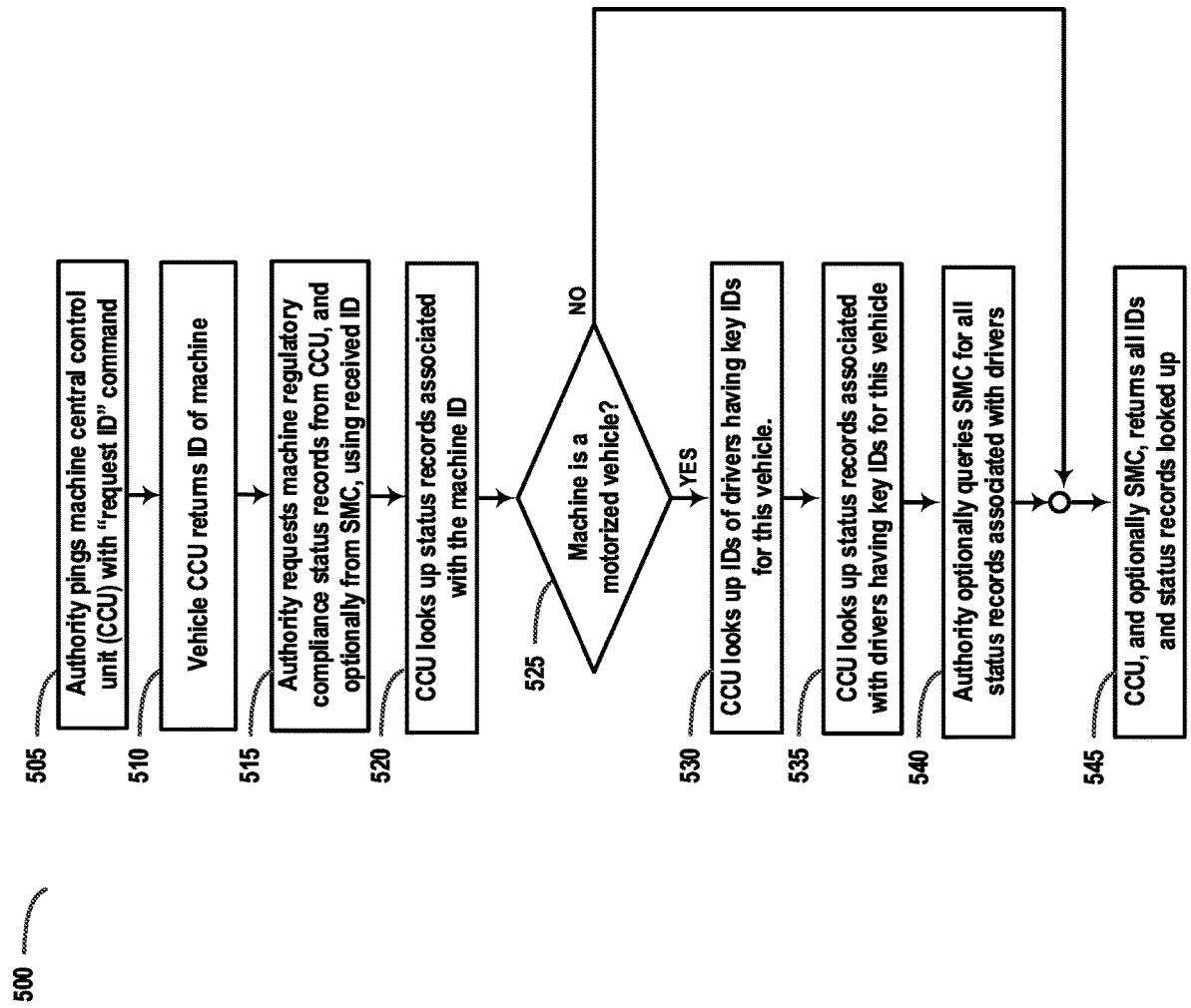
FIG. 5 is a block diagram illustrating a method of interrogating the regulatory compliance state of a motorized vehicle or a non-vehicle machine, according to some embodiments.

FIG. 5 is a block diagram illustrating a method 500 of interrogating the regulatory compliance status of a motorized vehicle 200 or a non-vehicle machine 201, according to some embodiments. Each motorized vehicle 200 and non-vehicle machine 201 (generically, "machine") incorporates a central control unit (CCU) 250 that contains, among other things, a storage of regulatory compliance status records 252. A subscriber, typically a law enforcement agency (generically, "authority"), can interrogate the CCU 250 statuses 252 to obtain details as to the status, and history, of regulatory compliance of the machine. Alternatively, or in addition, the subscriber or authority can also query the SMC 120 to retrieve regulatory compliance records 124 from SMC 120.

In operation 505, the authority can send a signal to the machine (200 or 201) to return the unique identifier (ID) of the machine (200 or 201). In a motorized vehicle 200, this may be the vehicle identification number (VIN) of the MV 200, or it may be a registration license number of the MV 200. In an embodiment, the unique identifier of the MV 200 can be an arbitrary unique identifier (ID), assigned by SMC 120 for the vehicles, drivers, and machines database 123. The unique ID can be used to query the regulatory compliance records stored in the statuses 252 storage in the central control unit 250 of the machine. The signal to the machine by the authority can be an automated "ping" signal to the machine (200 or 201) to return the unique ID of the machine (200 or 201).

In operation 510, the requesting authority receives the unique ID of the machine (200 or 201) from the central control unit 250 of the machine. The authority can then use the unique ID to request detailed regulatory compliance status from the machine CCU 250 status 252 storage.

In operation 515, the authority signals the machine (200 or 201) to return regulatory compliance status records for the machine having the unique ID. The signal to the machine may include the unique ID of the machine and a unique ID of the requesting authority, such as a unique ID of a police patrol car that signaled the request. The CCU 250 of the machine can access its own regulatory compliance status 252 storage and return all regulatory compliance history for the machine. In an embodiment, the authority may limit the requested regulatory compliance history to a specified window of time, e.g. the last 5 years. In an embodiment, update and retrieval rules database 122 of SMC 120 can have rules that limit the amount of regulatory compliance history for a machine that the authority can access.

In operation 520, CCU 250 of the machine (200 or 201) looks up status records for the machine (200 or 201) from its own statuses storage 252.

In operation 525, it can be determined whether the machine (200 or 201) is a motorized vehicle 200 or a non-vehicle machine 201. If the machine is a motorized vehicle 200, then method 500 continues at operation 530, otherwise method 500 continues at operation 545.

In operation 530, CCU 250 of the motorized vehicle 200 looks up, in the CCU 250 statuses 252 storage, the regulatory compliance information of any drivers that are associated with the motorized vehicle 200. Drivers of a motorized vehicle 200 have a key which contains an RFID tag that is registered with the CCU 250 in IDs storage 251 of CCU 250. Each such driver will also have a driver license that was issued by a department of motor vehicles (DMV) and such license will have a unique identifier. The driver license unique identifier is associated, in IDs storage 251 of CCU 250, with the motor vehicle 200 unique identifier and the RFID of the key for the motorized vehicle 200.

In operation 535, CCU 250 can look up regulatory compliance records in statuses 252 storage for all drivers having a key with and RFID associated with the motorized vehicle 200.

In operation 540, the requesting authority can optionally use the unique identifier of the motorized vehicle 200 to request, from SMC 120, all regulatory compliance records 124 stored with SMC 120.

In operation 545, CCU (and optionally SMC 120) can return all regulatory compliance records associated with the machine (200 or 201) having the unique ID, and also records of drivers, if the machine is a motorized vehicle 200, to the requesting authority.

The authority may evaluate the returned regulatory compliance records and decide to initiate a controlled stop of a motorized vehicle, as described below with reference to FIG. 6.

Figure 6:
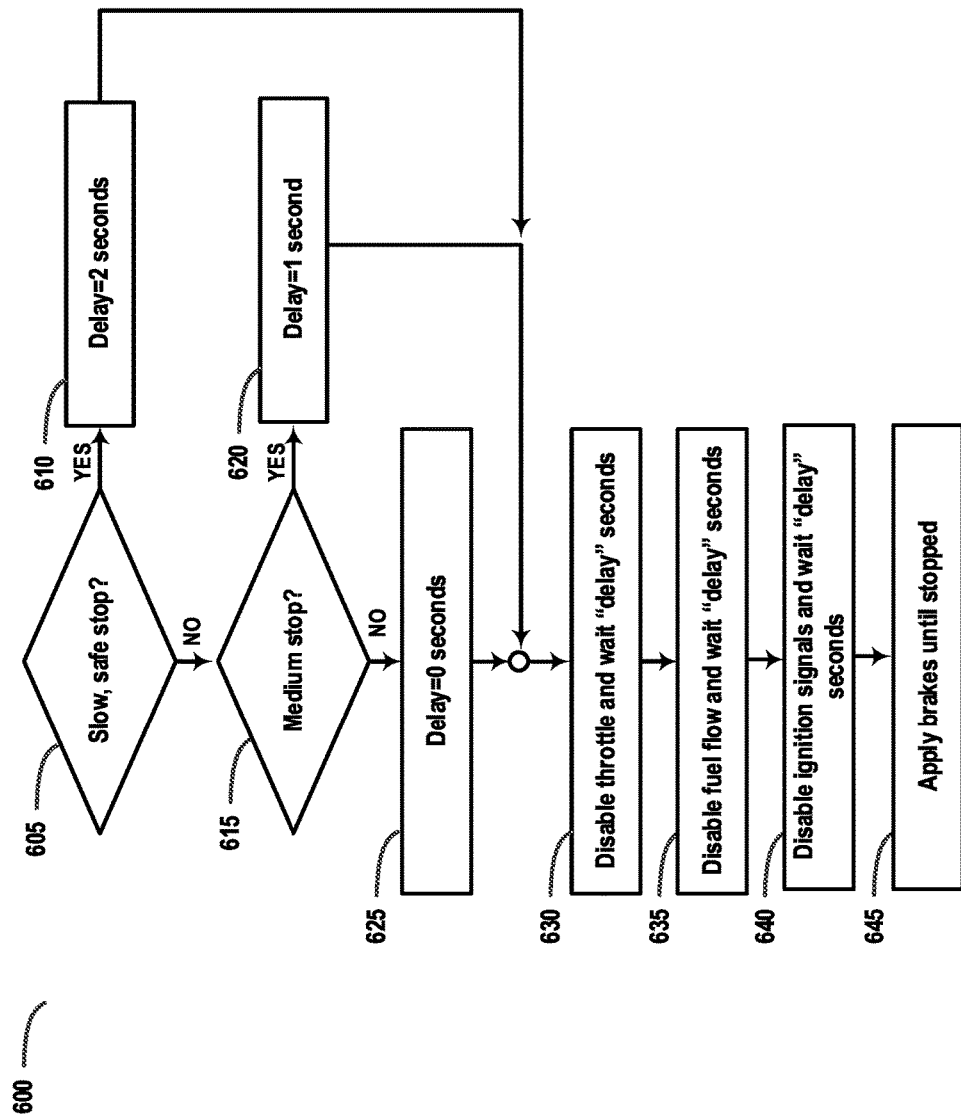
FIG. 6 is a block diagram illustrating a method of controlling a vehicle to a safe stop in accordance with some embodiments.

FIG. 6 is a block diagram illustrating a method 600 of controlling a motorized vehicle 200 to a safe stop in accordance with some embodiments. Method 600 presumes that an authority has already requested the unique ID of a motorized vehicle 200 and has decided to initiate a safe stop to prevent a possible high-speed car chase. The authority may have also already queried the motorized vehicle 200 to be safe stopped, and determined an urgency for stopping the vehicle that depends upon numerous real-world circumstances, such as an amount of traffic the MV 200 to be stopped, whether the MV 200 to be stopped is approaching a school zone, or a highway, or the driver is driving erratically. Method 600 describes three different "speeds" of safe stop: slow, medium, and immediate. The requesting authority makes the decision which type of stop of initiate based upon the circumstances of a particular engagement with the motorized vehicle 200 to be stopped. While three types of safe stop are described, with specific example delay values, any number of levels of safe stop can be implemented with varying delay values to control the MV 200 to a stop. Method 600 is described below with reference to subsystems of MV 200, described above with reference to FIG. 2A.

In operation 605, it can be determined whether the authority has selected a slow, safe stop. If so, then in operation 610 a delay time between safe stop operations is set to 2 seconds, and method 600 continues at operation 630. Otherwise method 600 continues at operation 615.

In operation 615, it can be determined whether the authority has selected a medium safe stop. If so, then in operation 620 the delay time is set to one second, otherwise in operation 625 the delay is set to 0 seconds. Method 600 continues at operation 630.

In operation 630, central control unit (CCU) 250 of the MV 200 to be stopped receives the safe stop command from the authority and the requested delay value. In operation 630, the CCU 250 of the MV 200 to be stopped issues a command to the electronic control unit (ECU) 260 of the MV 200 to be stopped, to disable the throttle input to the MV 200. Throttle input may be an accelerator pedal or "gas pedal" or other apparatus that performs the function of commanding a drive mechanism of the MV 200 to move the MV 200. With the throttle input disabled, no matter how much the driver of MV 200 tries to accelerate the MV 200, the ECU 260 of MV 200 blocks the command to accelerate the MV vehicle 200. CCU 250 of MV 200 then waits the "delay" amount of time, and continues at operation 635.

In operation 635, CCU 250 sends a command to ECU 260 of the MV 200 to be safe stopped to stop fuel flow 230 to the engine of MV 200, then wait "delay" seconds. Stopping fuel flow may include disabling one or more fuel pumps of MV 200, and/or stopping the operation of one or more fuel injectors or a throttle body of MV 200. Cutting fuel flow to the engine, before cutting the ignition signals to the engine, can avoid backfires of the engine that occur when unburned fuel is ignited due to heat of the engine or other ignition source. Method 600 continues at operation 640.

In operation 640, CCU 250 sends a command to ECU 260 to stop ignition signals to spark plugs of the engine of the MV 200. CCU 250 then waits the "delay" amount of time and method 600 continues at operation 645.

In operation 645, CCU 250 sends a command to ECU 260 to apply braking control 240 to stop the MV 200. In an embodiment, CCU 250 can calculate the amount of braking signal to send based upon factors such as the current speed of MV 200, whether MV 200 is approaching another MV 200, or whether a gyroscope in MV 200 indicates that MV 200 is traveling uphill, downhill, beginning a turn for a curve.

In an embodiment, an authority can send a subsystem-specific command for the CCU 250 to send to the ECU 260. For example, the authority may command the MV 200, via CCU 250, to apply maximum braking via braking control 240, or a specified percentage of maximum braking control.

Once the MV 200 has been brought to a safe stop, the authority can command the CCU 250 of MV 200 to disable all driving functionality so that the MV 200 cannot suddenly speed away.

Figure 7:
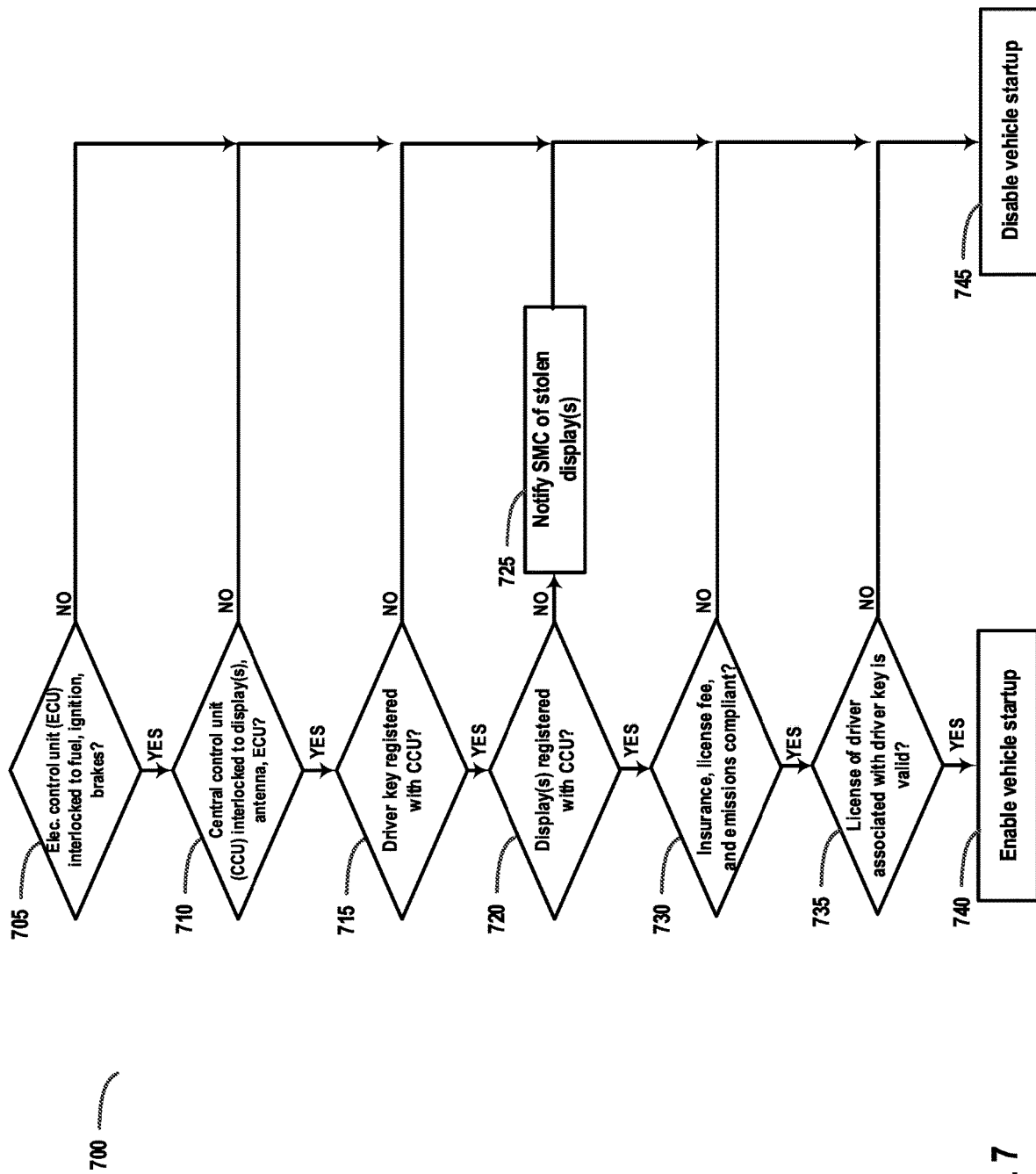
FIG. 7 is a block diagram illustrating a method of performing a startup check of a motorized vehicle, according to some embodiments.

FIG. 7 is a block diagram illustrating a method 700 of performing a startup check of a motorized vehicle 200 according to some embodiments. Portions of method 700 are described with reference to subsystems of a motorized vehicle (MV) 200 as described above, with reference to FIG. 2A. As shown in FIG. 2A, the subsystems of MV 200 are interlocked 255 such that if any subsystem fails, or is missing, or does not respond, or the unique identifier (ID) associated with each subsystem is not the same as the unique ID registered in the CCU 250 IDs 251 storage for that subsystem, then the MV 200 will not start. Additional criteria for starting the MV 200 are described below.

In operation 705, it can be determined whether the MV 200 electronic control unit (ECU) 260 is interlocked 255 with fuel control 230, ignition/drive control 235, and braking control 240 subsystems. To satisfy the interlock 255 criteria, each of fuel control 230, ignition/drive control 235, and braking control 240 must: (1) respond to inquiry from ECU 260 as to their respective unique subsystem IDs, (2) the unique subsystem IDs must each match a stored unique subsystem ID registered in the IDs 251 storage of the CCU 250 for the MV 200, (3) or the subsystem returns a subsystem "OK" code and does not return any subsystem failure codes. If any of the interlock 255 criteria are not met, then method 700 continues at operation 745, otherwise method 700 continues at operation 710.

In operation 710, it can be determined whether the CCU 250 is interlocked to display(s) 300A (front/rear) and antenna 210. To satisfy the interlock 255 criteria, each of display(s) 300A (front/rear) and antenna must: (1) respond to inquiry as to their respective unique subsystem IDs, (2) the unique subsystem IDs must each match a stored unique subsystem ID registered in the IDs 251 storage of the CCU 250 for the MV 200, (3) and the subsystem must return an "OK" code and not return any subsystem failure codes. If any of the interlock 255 criteria are not met, then method 700 continues at operation 745, otherwise method 700 continues at operation 715.

In operation 715, it can be determined whether a physical key is present that is registered with the CCU 250 IDs 251 storage. Each physical key associated with an MV 200 has an RFID tag which has a unique ID associated with the RFID tag. The RFID tags, and therefore the physical keys, are registered with the CCU 250 IDs 251 storage. When a physical key is present inside the MV 200, the CCU 250 can read the unique ID from the physical key. If the key does not return a unique ID, or the unique ID returned by the key does not match a unique ID stored in the CCU 250 IDs 251 storage, then method 700 continues at operation 745, otherwise method 700 continues at operation 720.

In operation 720, it can be determined whether the unique IDs associated with the display(s) 300A (front/rear) are registered with the CCU 250 IDs 251 storage. If not, it implies that one or more of the display(s) 300A have been stolen from another motorized vehicle and method 700 continues at operation 725. Otherwise, method 700 continues at operation 730.

In operation 725, CCU 250 can notify SMC 120 that the display(s) 300A may be stolen from another motorized vehicle and installed on the MV 200. Method 700 continues at operation 745.

In operation 730, it can be determined whether the CCU 250 statuses 252 storage indicates that the MV 200 has the required insurance, license fees and/or vehicle tax have been paid, and emissions certification indicates that the MV 200 complies with motorized vehicle emissions standards. If not, then method 700 continues at operation 745, otherwise method 700 continues at operation 735.

In operation 735, it can be determined whether a license of a driver associated with a physical key of the motorized vehicle 200 is licensed to operate a motorized vehicle 200. If there are multiple drivers associated with the physical key, a driver may be required to identify which driver he, or she, is to complete this operation. By selecting a driver name associated with the key, the driver is attesting that he, or she, is the driver selected. In an embodiment, selecting a driver name other than the driver's own name may be a violation of regulatory compliance. If the driver is a licensed driver of motor vehicles, and the driver is associated with the physical key that is associated with the MV 200, then method 700 continues at operation 740. Otherwise, method 700 continues at operation 745.

In operation 740, all startup preconditions have been met, and the MV 200 is enabled for startup and method 700 ends.

In operation 745, one or more startup preconditions have not been met, and the MV 200 is disabled from startup and method 700 ends.

Figure 8:
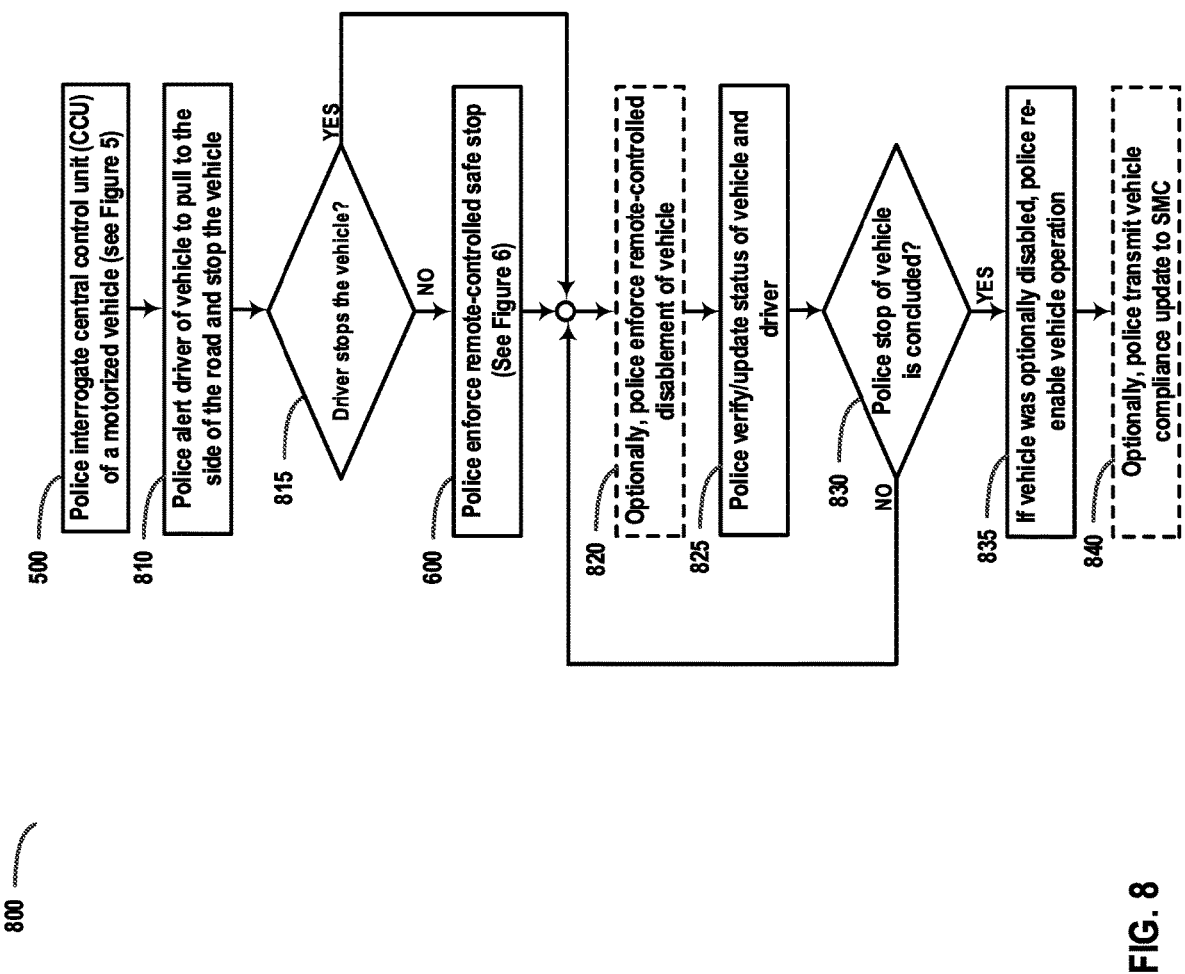
FIG. 8 is a block diagram illustrating a method of performing a safe stop of a moving motorized vehicle to avoid a high-speed chase, in accordance with some embodiments.

FIG. 8 is a block diagram illustrating a method 800 of performing a safe stop of a moving motorized vehicle 200 to avoid a high-speed chase in accordance with some embodiments.

In operation 500, a law enforcement agency (generically, "officer") can interrogate the central control unit (CCU) 250 of a motorized vehicle (MV) 200 to determine the regulatory compliance status of the MV 200 and regulatory compliance status of a driver of the MV 200. The officer may perform the interrogation in response to observation one or more display indications on front or rear displays 300A of MV 200. Operation 500 is described above with reference to FIG. 5.

In operation 810, the officer may alert the driver of the MV 200 to pull to the side of the road. In an embodiment, the officer can send a message to CCU 250 of the MV 200 to be stopped that notifies the driver of MV 200 that the driver has been instructed to pull over and stop MV 200.

CCU 250 of MV 200 can display the message as text on a display inside MV 200, or the message can be generated as audio inside MV 200, instructing the driver of MV 200 to pull over and stop MV 200.

In operation 815, it can be determined whether the driver has stopped MV 200 as instructed by the officer. If not, then method 800 continues at operation 600, otherwise method 800 continues at operation 820.

In operation 600, the officer transmits a command to the CCU 250 of the MV 200 to perform an automatic safe stop. Method 600 is described above with reference to FIG. 6. In an embodiment, a safe stop instruction sent to CCU 250 of the MV 200 to be stopped can be a "slow," "medium," or "immediate," safe-stop. In an embodiment, the officer can transmit a series of safe stop commands that are directed to each MV 200 subsystem, such as disabling fuel flow 230, disabling ignition/drive control 235, and/or applying braking control 240.

In operation 820, once MV 200 has stopped, the officer can optionally send another command to CCU 250 of MV 200 to enforce a disablement of MV 200, so that MV 200 cannot drive away from the stop.

In operation 825, the officer can approach the MV 200 and verify/update the regulatory compliance status of driver and MV 200.

In operation 830, it can be determined whether the officer's stop of MV 200 is concluded, such that the driver may now drive away. If not, then method 800 continues at operation 820, otherwise method 800 continues at operation 835.

In operation 835, if MV 200 was optionally disabled by a command from the officer, then the officer can issue a command to CCU 250 to enable normal operation of MV 200 such that MV 200 can now driver away.

In operation 840, the officer can optionally provide updates of regulatory compliance records to SMC 120 for driver and/or MV 200. SMC 120 can push such updates to MV 200 and to subscribers 121 of regulatory compliance records 124, in accordance with update and retrieval rules 122.

Figure 9:
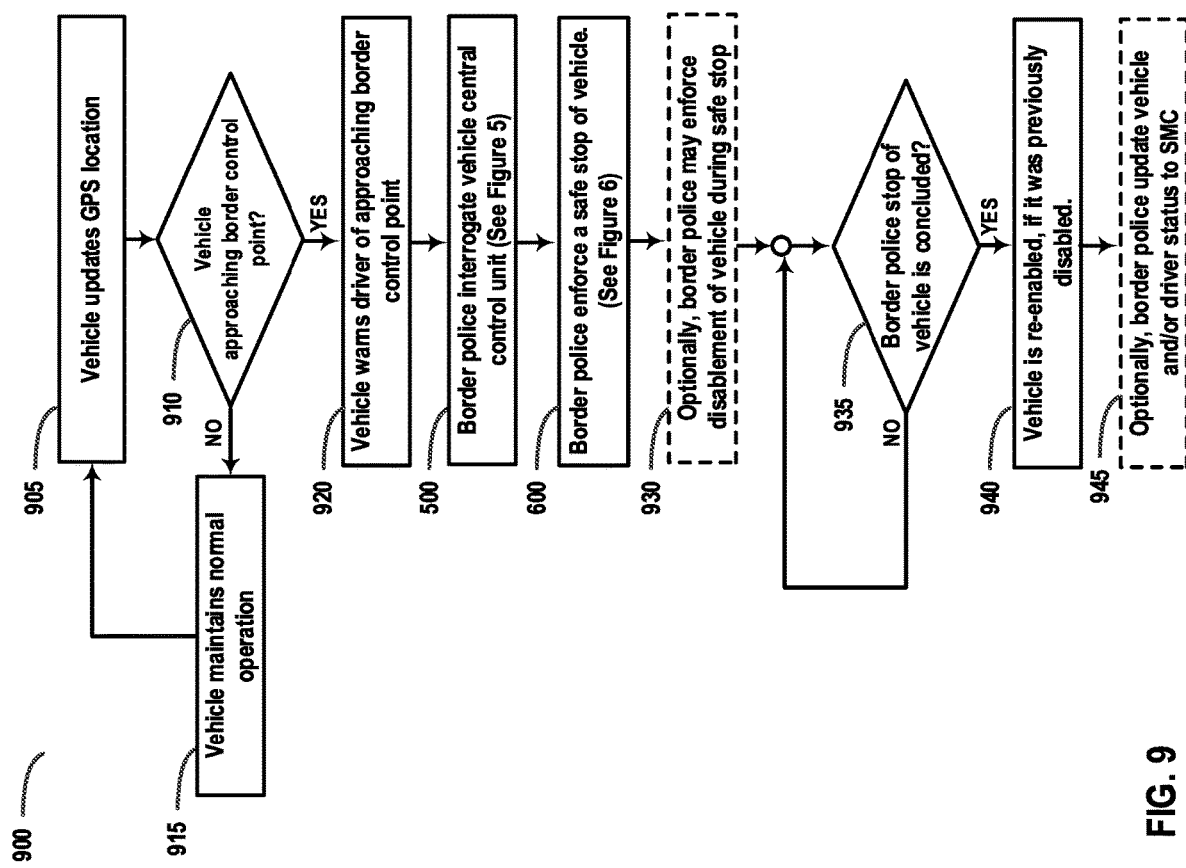
FIG. 9 is a block diagram illustrating a method of performing a safe stop of a motorized vehicle at a border control point, according to some embodiments.

FIG. 9 is a block diagram illustrating a method 900 of performing a safe stop of a motorized vehicle 200 at a border control point, according to some embodiments. Typically, all motorized vehicles 200, regardless of their regulatory compliance status, are required to stop at a border control point before being permitted to enter beyond the control point. Control points may be at private entrances to homes or businesses, entry to a military base, entry to a state, such as an agricultural checkpoint, or at a border to another country. Method 900 enables border control officer to safely stop a motorized vehicle 200 attempting to pass the control point and to safely verify the regulatory compliance status of the driver and motorized vehicle 200 before permitting the driver and motorized vehicle 200 to pass the control point.

In operation 905, a motorized vehicle (MV) 200 updates its location with a GPS system that is part of computing hardware 295 of MV 200.

In operation 910, it can be determined whether MV 200 is approaching a border control point. If so, then method 900 continues at operation 920. Otherwise method 900 continues at 915, wherein MV 200 maintains normal operation at operation 915 and method 900 continues at operation 905.

In operation 920, CCU 250 of MV 200 displays an visual or audio warning message to the driver of MV 200 that the MV 200 is approaching a border control point.

In operation 500, a border patrol officer can interrogate the CCU 250 of MV 200 to obtain regulatory compliance records associated with the driver and the MV 200. Operation 500 is described above with reference to FIG. 5.

In operation 600, the border control officer can enforce a safe stop of MV 200. Method 600 is described above with reference to FIG. 6. In an embodiment, a safe stop instruction sent to CCU 250 of the MV 200 to be stopped can be a "slow," "medium," or "immediate," safe stop. In an embodiment, the border officer can transmit a series of safe stop commands that are directed to each MV 200 subsystem, such as disabling fuel flow, disabling ignition/drive control, and/or applying braking control 240.

In operation 930, once MV 200 has stopped, border officer can optionally send another command to CCU 250 of MV 200 to enforce a disablement of MV 200, so that driver of MV 200 cannot drive away from the stop.

In operation 935, it can be determined whether the border officer has concluded the stop of MV 200. If not, then method 900 rechecks operation 935, otherwise method 900 continues at operation 940.

In operation 940, if the border officer optionally disabled MV 200 during the border control stop, then the border officer may enable normal operation of MV 200 so that the driver and MV 200 can drive away.

In operation 945, the border officer can optionally provide updates to SMC 120 of regulatory compliance records 124 for driver and/or MV 200. SMC 120 can push such updates to MV 200 and to subscribers 121 of regulatory compliance records 124, in accordance with update and retrieval rules 122.

Figure 10:
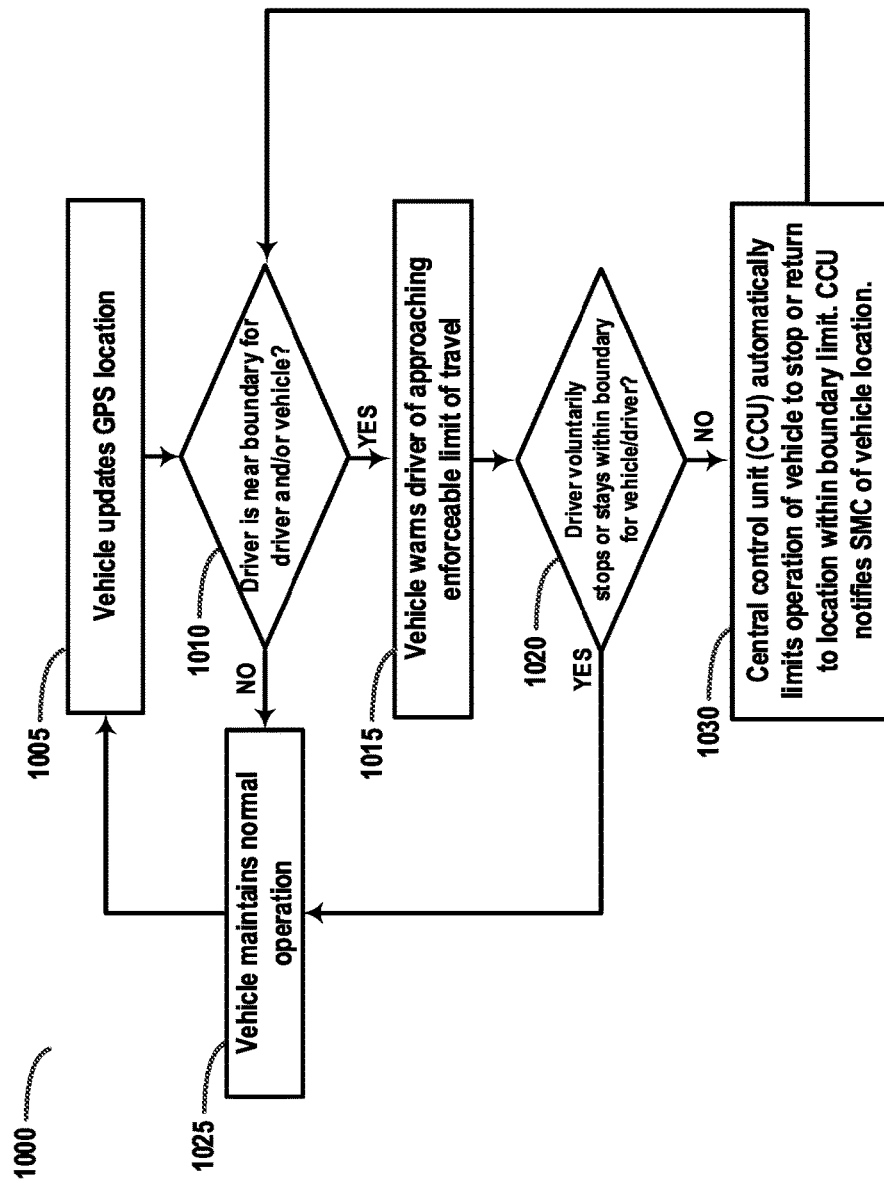
FIG. 10 is a block diagram illustrating a method of limiting a driver and/or motorized vehicle to a predefined boundary area, according to some embodiments.

FIG. 10 is a block diagram illustrating a method 1000 of limiting a driver and/or motorized vehicle (MV) 200 to a predefined boundary area, according to some embodiments. Method 900 described a method of controlling entry of a driver and MV 200 to a controlled area, using active safe stop technology. Method 1000 describes a method of confining a driver and MV 200 to a controlled area, using active safe stop technology.

In operation 1005, a motorized vehicle (MV) 200 updates its location with a GPS system that is part of computing hardware 295 of MV 200.

In operation 1010, it can be determined whether MV 200 is approaching a boundary for the driver and/or MV 200. MV 200 can perform this task by accessing regulatory compliance records stored in the CCU 250 statuses 252 storage. Statuses 252 can store a boundary limitation on the driver, or a predetermined boundary limitation on MV 200. In an example, an MV 200 that is rented in a first country may not be permitted to leave the first country, either by law or by terms of the rental agreement. Similarly, a driver that is licensed to operate the MV 200 in the first country may not be permitted to leave the first country, or may not be licensed to drive the MV 200 in a second country. Thus, the driver and/or MV 200 can be confined to a predetermined boundary. If the driver is navigating the MV toward a boundary for the driver or MV 200, then method 1000 continues at operation 1015, otherwise method 1000 continues at operation 1025.

In operation 1015, CCU 250 of MV 200 displays a visual or audio message to the driver of MV 200 that the driver is approaching a boundary limit for the driver and/or the MV 200. In an embodiment, the message can inform the driver whether it is the MV 200, the driver, or both, that are not permitted beyond the boundary area. In an embodiment, the message can describe the boundary limit to the driver.

In operation 1020, it can be determined whether the driver voluntarily stops the MV 200 or stays within the predetermined boundary area for the driver and/or MV 200. If so, then method 1000 continues at operation 1025 Otherwise method 1000 continues at operation 1030.

In operation 1025, CCU 250 of MV 200 maintains normal operation of MV 200. Method 1000 continues at operation 1005.

In operation 1030, it has been determined that the driver did not voluntarily stop MV 200 inside the boundary area, and the driver has not navigated MV 200 back inside the boundary area. Thus, CCU 250 of MV 200 can automatically impose limits on the operation of MV 200 to stop MV 200 or to limit MV 200 to only return further inside the boundary area. In an embodiment, CCU 250 can transmit a motorized vehicle 200 regulatory non-compliance record to SMC 120. The non-compliance record can include the unique ID of the MV 200, the unique ID (e.g. driver license number) of the driver, a GPS location of the MV 200, a date/time of the record, and other information. The regulatory non-compliance record can be pushed to subscribers by SMC 120, including MV 200, as defined in update and retrieval rules database 122 of SMC 120.

Figure 11:
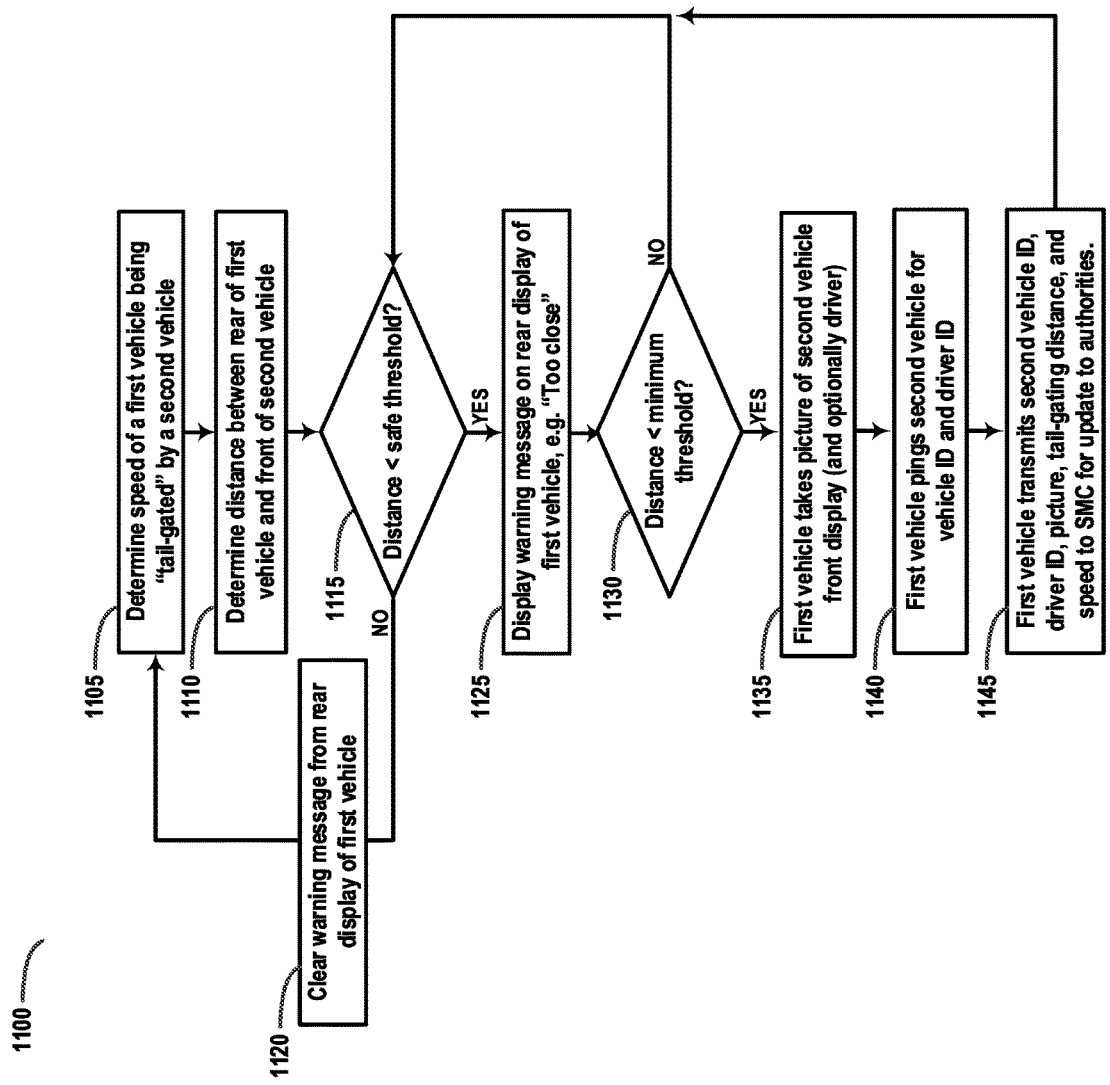
FIG. 11 is a block diagram illustrating a method of monitoring and reporting "tail-gating" by a second vehicle behind a first vehicle, according to some embodiments.

FIG. 11 is a block diagram illustrating a method 1100 of monitoring and reporting "tail-gating" of a first motorized vehicle (MV) 200 by a second MV 200 behind the first MV 200, according to some embodiments. "Tail-gating" refers to the practice of driving at an close and unsafe distance behind an MV 200. An unsafe distance is generally determined from the speed at which both the first and second MV 200s are traveling, a distance between the rear of the first MV 200 and the front of the second MV 200, and an estimated optimal reaction time for a driver of the second MV 200 to apply the brakes of second MV 200 and avoid a collision with the rear-end of the first MV 200. The speed at which both vehicles are traveling can be approximated by the first (front) MV from its own speedometer. The distance between the rear of the first MV 200 and front of the second MV 200 can be determined using the emitter/receiver 307 in the rear display 300A of the front MV 200. Optimal human reaction time is estimated at approximately 0.75 seconds. Assuming a worst case scenario that the first (front) MV 200 had to apply its brakes suddenly, such as to avoid a stopped vehicle, then the CCU 250 of the first (front) MV 200 can estimate a safe distance at which the second (rear) MV 200 should maintain. Logic for method 1100 can be implemented by CCU 250 using computing hardware 295 of the first (front) MV 200.

In operation 1105, the first (front) MV 200 can determine its own speed of travel from a speedometer reading of the first MV 200 by CCU 250 of the first MV 200. This should be approximately the same speed that the second (rear) vehicle is traveling.

In operation 1110, the first MV 200 can use the emitter/receiver 307 of its rear display 300A to determine a distance from the rear end of first MV 200 to the front end of second MV 200. In an embodiment, emitter/receiver 307 of the rear display 300A of the first MV 200 can repeatedly measure the distance from the rear bumper of the first MV 200 to the front bumper of the second MV 200. A rapid decrease in this measurement may indicate an urgency to avoiding a rear-end collision.

In operation 1115, CCU 250 of the first MV 200 can determine, given the speed of the MV 200's and the distance at which the second MV 200 is behind the first MV 200, whether the second MV 200 is unsafely close to the rear end of the front MV 200; i.e. second MV 200 is "tail-gating" first MV 200, which is both unlawful and unsafe. If the distance between the first and second MV 200's is less than a safe threshold, then method 1100 continues at operation 1125. Otherwise method 1100 continues at operation 1120.

In operation 1120, first (front) MV 200 can clear its rear display 300A of any warning message to the second (rear) MV 200. Method 1100 continues at operation 1105.

In operation 1125, first (front) MV 200 can display a warning message on its rear display 300A that the second MV 200 is too close behind the first MV 200.

In operation 1130, it can be determined whether the distance between the rear of the first MV 200 and the front of the second MV 200 is less than a minimum safe distance. If so, then method 1100 continues at operation 1135. Otherwise method 1100 continues at operation 1115.

In operation 1135, CCU 250 instruct camera 306 of rear display 300A of the first MV 200 to take a picture of the front display 300A of the second MV 200. In an embodiment, camera 306 can additionally take a picture of the driver of the second MV 200. In an embodiment, a GPS of the first MV 200 can retrieve a current location of the first MV 200.

In operation 1140, CCU 250 of the first MV 200 can send a command to retrieve the unique ID of the second MV 200 and optionally a unique ID of the driver of the second MV 200.

In operation 1145, the first MV 200 can transmit a regulatory non-compliance record to SMC 120, which can include the picture(s), GPS location, date/time, unique ID of the second MV 200 and unique ID of the driver of the second MV 200. SMC 120 can add the regulatory non-compliance record to its database 124 of regulatory compliance records and can transmit the regulatory non-compliance to subscribers 121 in accordance with update and retrieval rules database 122.

Figure 12:
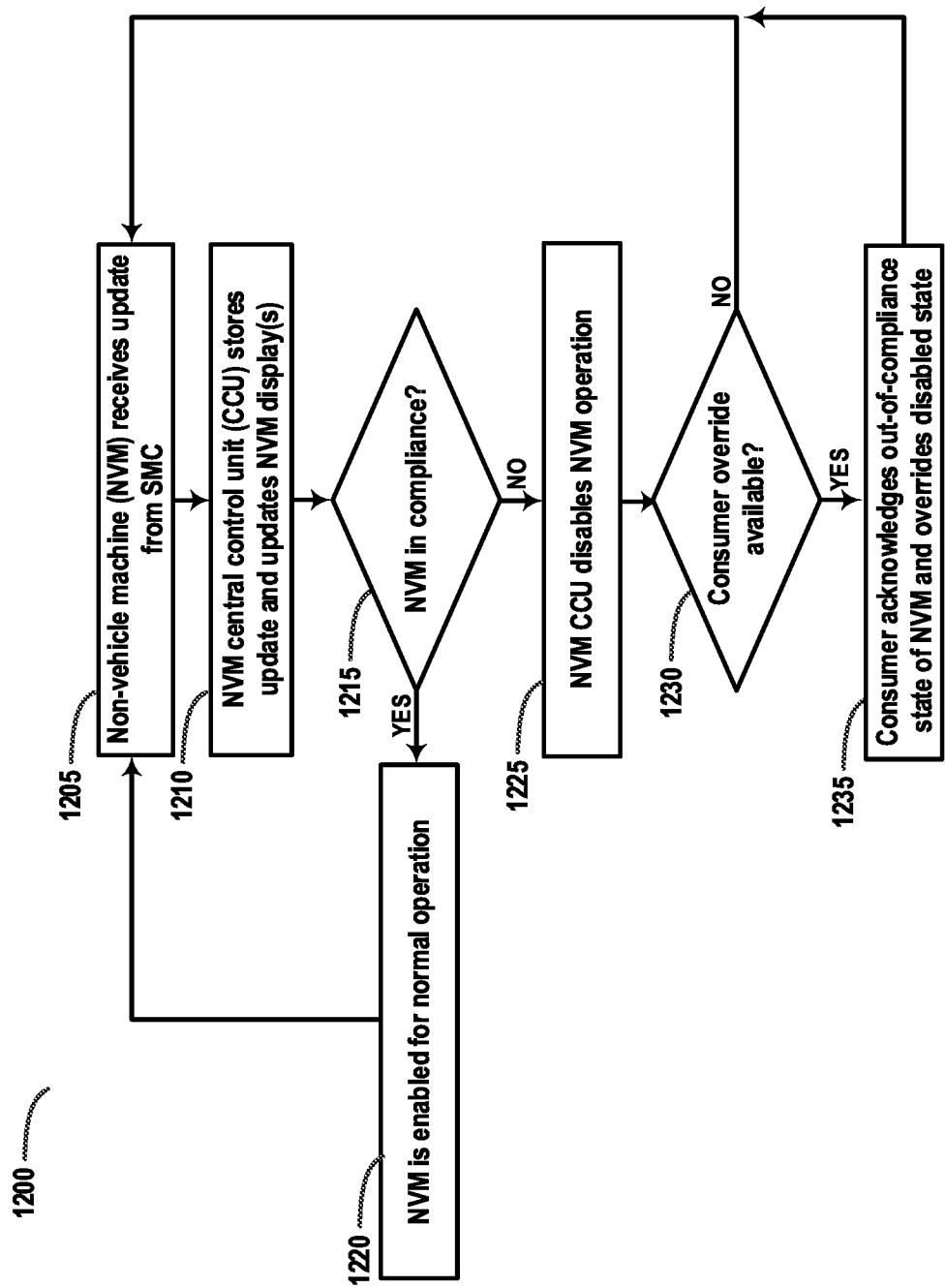
FIG. 12 is a block diagram illustrating controlling operation of a non-vehicle machine in accordance with a state of regulatory compliance of the machine, according to some embodiments.

FIG. 12 is a block diagram illustrating a method 1200 of controlling operation of a non-vehicle machine (NVM) 201 in accordance with a state of regulatory compliance of the NVM 201, according to some embodiments. An NVM 201 can be any of a wide variety of machines that are subject to regulatory compliance, such as a gasoline pump, an elevator, an escalator, utility meters, certain medical equipment, and the like. Logic for the implementation of method 1200 can be programmed into central control unit (CCU) 250 of the NVM 201 and executed using hardware 295 of NVM 201.

In operation 1205, CCU 250 of NVM 201 can receive an update to a regulatory compliance record regarding the NVM 201.

In operation 1210, CCU 250 of NVM 201 can store the received regulatory compliance record in CCU 250 statuses 252 storage. CCU 250 an update display(s) 300B of NVM 201 to reflect the updated regulatory compliance status of the NVM 201.

In operation 1215, it can be determined whether the NVM 201 is in compliance with applicable regulations. In an embodiment, applicable regulations can be programmed into CCU 250 and are updated by SMC 120. If NVM 201 is not in compliance with regulatory requirements, then method 1200 continues at operation 1225, otherwise method 1200 continues at operation 1220.

In operation 1220, NVM 201 is compliant with regulatory requirements and is enabled for normal operation. Method 1200 continues at operation 1205.

In operation 1225, NVM 201 is not compliant with regulatory requirements and CCU 250 of NVM 201 can automatically disable operation of NVM 201. Some NVM's, e.g. medical devices, may be prohibited by law from being used when the device is not compliant with regulatory requirements. Some devices, e.g., a gasoline pump that has not been recently recertified that it accurately dispenses the displayed amount of gasoline, may be able to have a user override of an automatic disabling of the gasoline pump.

In operation 1230, it can be determined whether a consumer disablement override is available to the consumer. If not, then method 1200 continues at operation 1205. Otherwise method 1200 continues at operation 1235. Logic to implement the determination of whether a consumer override of automatic disabling of an NVM 201 can be programmed into CCU 250 of the NVM 201.

In operation 1235, a consumer can select "override" of automatic disablement of the NVM 201. By doing so, consumer accepts the out-of-compliance status of the NVM 201. In an embodiment, CCU 250 of NVM 201 may record, in statuses 252 storage, instances of users overriding the automatic disablement of NVM 201 for later retrieval by, e.g., a re-certification agent or authority. Method 1200 continues at operation 1205.

Figure 13:
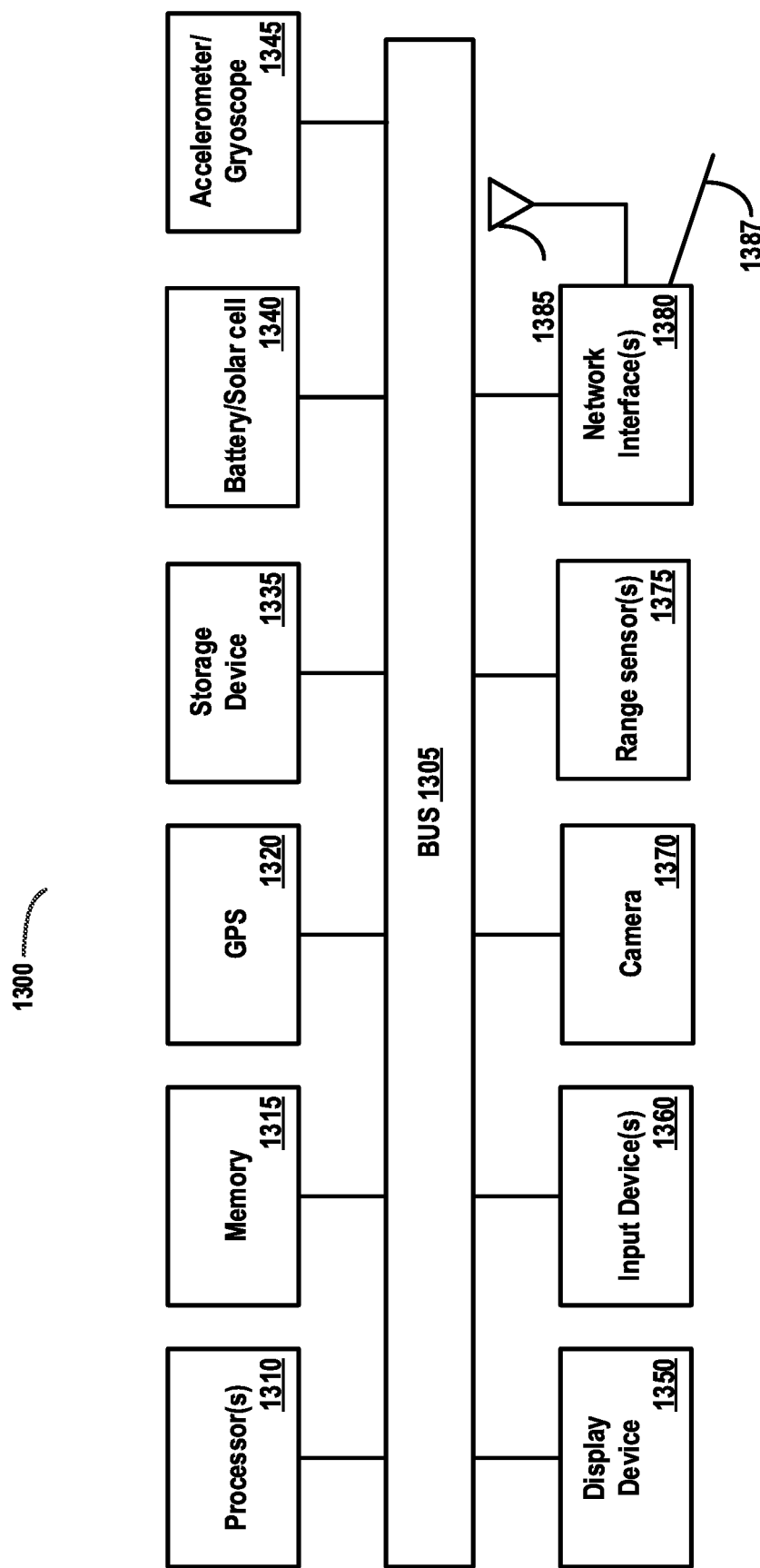
FIG. 13 is a block diagram illustrating representative hardware upon which any of the embodiments described herein may be practiced.

FIG. 13 is a block diagram illustrating representative hardware for a computing system 1300 upon which any of the embodiments described herein may be practiced. Computing system 1300 can be used to implement the computer hardware 295 of a motorized vehicle 200 and/or non-vehicle machine 201 as described above with reference to FIGS. 2A and 2B. A subset of computing system 1300 can be used to implement motorized vehicle displays 300A and non-vehicle machine display(s) 300B as described above with reference to FIGS. 3A-3C.

Computing system 1300 includes bus 1305 to communicate information between components coupled to the bus 1305. Bus 1305 can be a high-speed backplane, a fiber optic network, a wired or wireless network, or other interconnecting bus. Computing hardware 1300 can include any or all of the following components, interconnected via bus 1305. Components can include a processing system 1310, memory 1315, a global positioning system (GPS) 1320, one or more storage devices 1335, a power source, such as a battery or solar cell 1340, an accelerometer and/or gyroscope 1345, one or more display elements comprising a display device 1350, input/output devices 1360, a camera 1370, one or more range detecting sensors 1375, and one or more network interface elements 1380, including a wired interface 1387 or wireless interface 1385.

While computing system 1300 is illustrated with a single processor, computing system 1300 may include multiple processors and/or co-processors 1310. Processor(s) 1310 can include at least one hardware processor, such as a central processing unit (CPU), a graphics processing unit (GPU), a parallel-pipelined processor, an application specific integrated circuit (ASIC), or a field programmable gate array (FPGA).

Computing system 1300 can further include one or more types of memory 1315 including random access memory (RAM), read-only memory (ROM), flash memory, static memory, and the like. Memory 1300 can store executable program instructions that, when executed by a processing system 1310, can cause computing system 1300 to execute any of the functionality described herein.

Storage 1335 can include non-volatile storage such as magnetic disk, flash memory, optical disk, compact disk read-only memory (CD-ROM), or digital video disk (DVD).

Computing system 1300 can include a location determination system 1320 that determines a physical location of an object connected to the bus 1305 with respect to a coordinate system of some type. Location determination system 1320 can be, e.g., a satellite-based global positioning system (GPS), a triangulation of cell towers, a ground-based radio-navigation system, or other location determination system. The physical object can be, e.g., a motorized vehicle 200 or a non-vehicle machine 201.

Computing system 1300 can include a power source 1340. In an embodiment, power source 1340 can be a power generation source of, e.g., motorized vehicle 200, such as a generator or alternator. Power source 1340 can alternatively, or in addition, comprise a battery. Power source 1340 can have a backup source, such as one or more solar cells that can supply power to computing system 1300 and/or recharge a battery that supplies power to computing system 1300. In an embodiment, computing system 1300 can have a "reduced power" mode of operations in the event of loss of power from a primary source, such as the battery or generator.

Computing system 1300 can further an accelerometer and gyroscope 1345. The accelerometer can measure acceleration and deceleration of a motorized vehicle (MV) 200. A gyroscope can measure angular velocity about an axis of rotation. The combination of an accelerometer and gyroscope can be used by the central control unit (CCU) 250 of MV 200 to detect that MV 200 may have been in an accident. CCU 250 can then report the accident to SMC 120, and SMC 120 can use push service 126 to notify subscribing emergency services and/or law enforcement of the accident. In an embodiment, the report to the SMC 120 can include the unique ID of MV 200, a GPS location of MV 200, and other data stored in CCU 250 statuses 252 and IDs 251, as appropriate.

Computing system 1300 can include one or more display devices 1350. Display device(s) 1350 can include displays 300A and 300B as described above with reference to FIGS. 3A-3C. Display(s) can include LED or LCD displays, segmented LED displays, LED emitters of a variety of colors, or other display element.

Computing system 1300 can include one or more input devices 1360. Input devices 1360 can include a keyboard, a touch keypad, a touch-sensitive display, mechanical switches, and the like.

Computing system 1300 can further include a camera module 1370. Camera module 1370 can be a charge coupled device (CCD) module, or an image detector using infrared sensors. Camera 1370 can be incorporated into MV 200 rear display 300A as camera 306. Pictures taken by camera 1370 can be stored in storage device 1335 and transmitted via network interface(s) 1380 to, e.g., a law enforcement agency or SMC 120.

Computing system 1300 can also include one or more range detecting devices, such as emitter/receiver 307 of rear display 300A of a motorized vehicle. Range detection can include an emitter, such as an infrared laser, and a detector that receives and measures reflections of signals emitted from the emitter. Logic to convert a time difference between emitting a signal and receiving a reflection of the emitted signal can be included in the range detecting device, or can be programmed as executable instructions in storage 1335 or memory 1315.

Network interfaces 1380 can include any type of network interface and protocol, including GSM, CDMA, WiFi, radio, Satellite communication, and the like. Network interface(s) 1380 can include an antenna 1385 or a wired connection 1387. Antenna 1385 can be antenna 210 as described above with reference to FIGS. 2A and 2B.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method to determine the regulatory compliance status of a regulated machine comprising the steps of:
    requesting by a central control unit (CCU) of a system management center comprising a regulatory compliance records database for managing receipt of regulatory compliance records for motorize vehicles, drivers of motorized vehicles, and for non-vehicle machines, a machine unique ID from a regulated machine;
    receiving a machine unique ID from the central control unit (CCU) of the regulated machine;
    requesting regulatory compliance status records for the regulated machine from the regulatory compliance records database;
    receiving regulatory compliance status records for the regulated machine,
    determining whether the regulated machine is a motorized vehicle,
    requesting by the central control unit (CCU) of the system management center a driver identification of the motorized vehicle;
    receiving an at least one driver identification of the motorized vehicle;
    determining an at least one driver status record related to the at least one driver identification of the motorized vehicle,
    requesting by the central control unit (CCU) of the system management center a motor vehicle unique ID from a motor vehicle;
    requesting by the central control unit (CCU) of the system management center by the central control unit (CCU) of the system management center a first subsystem qualifier from a fuel subsystem;
    requesting by the central control unit (CCU) of the system management center a first subsystem qualifier from a ignition subsystem;
    requesting by the central control unit (CCU) of the system management center a first subsystem qualifier from a brake subsystem;
    requesting by the central control unit (CCU) of the system management center a subsystem ID and a subsystem check from an information display of the motor vehicle;
    requesting by the central control unit (CCU) of the system management center a subsystem ID and a subsystem check from an antenna of the motor vehicle;
    verifying by the central control unit (CCU) of the system management center the motor vehicle unique ID;
    verifying by the central control unit (CCU) of the system management center the first subsystem qualifier from the fuel subsystem associates with an acceptable subsystem qualifier;
    verifying by the central control unit (CCU) of the system management center the first subsystem qualifier from the ignition subsystem associates with an acceptable subsystem qualifier;
    verifying by the central control unit (CCU) of the system management center the first subsystem qualifier from the brake subsystem associates with an acceptable subsystem qualifier;
    verifying by the central control unit (CCU) of the system management center the information display is interlocked with the central control unit of the motor vehicle by verifying the information display associates with an subsystem ID and the subsystem check is acceptable;
    verifying by the central control unit (CCU) of the system management center the antenna is interlocked with the central control unit of the motor vehicle by verifying the antenna associates with an subsystem ID and the subsystem check is acceptable;
    verifying by the central control unit (CCU) of the system management center presence of a registered physical key in the motor vehicle;
    verifying by the central control unit (CCU) of the system management center registration of information display with the central control unit of the motor vehicle;
    verifying by the central control unit (CCU) of the system management center compliance of insurance, license fee, and emissions of the motor vehicle with regulations; and
    receiving a unique driver identification of a driver in the motor vehicle, and verifying by the central control unit (CCU) of the system management center the driver has a valid driver's license, and
    disabling a throttle control of the motorized vehicle.

2. The method of claim 1 wherein the acceptable subsystem qualifier is an acceptable subsystem ID.

3. The method of claim 1 wherein the acceptable subsystem qualifier is an acceptable subsystem check.

4. The method of claim 1 further comprising enabling startup of the motor vehicle.

5. The method of claim 1 further comprising disabling startup of the motor vehicle.

* * * * *